(12) United States Patent
Frazier

(10) Patent No.: US 7,428,911 B1
(45) Date of Patent: Sep. 30, 2008

(54) SPILL CONTAINMENT SYSTEM AND METHOD

(75) Inventor: Douglas Frazier, Claremont, CA (US)

(73) Assignee: Expo Power Systems, Inc., Pomona, CA (US)

( * ) Notice: Subject to any disclaimer, the term of this patent is extended or adjusted under 35 U.S.C. 154(b) by 78 days.

(21) Appl. No.: 11/510,137

(22) Filed: Aug. 24, 2006

Related U.S. Application Data

(63) Continuation of application No. 09/960,759, filed on Sep. 21, 2001, now Pat. No. 7,124,771, which is a continuation of application No. 09/428,192, filed on Oct. 27, 1999, now Pat. No. 6,308,728.

(51) Int. Cl.
*A47F 1/04* (2006.01)
*G01M 3/16* (2006.01)

(52) U.S. Cl. .................. 137/312; 137/315.01; 137/375; 141/86; 220/571; 220/495.01

(58) Field of Classification Search .................. 137/255, 137/312, 375, 315.01; 141/86, 88; 220/571, 220/495.01, 573
See application file for complete search history.

(56) References Cited

U.S. PATENT DOCUMENTS

| | | | |
|---|---|---|---|
| 4,348,466 A | 9/1982 | Elehew et al. | 429/84 |
| 5,304,434 A * | 4/1994 | Stone | 429/99 |
| 6,308,728 B1 * | 10/2001 | Frazier | 137/312 |
| 6,395,417 B1 * | 5/2002 | Frazier | 429/49 |
| 6,401,946 B1 | 6/2002 | Chalasani et al. | 211/188 |
| 7,124,771 B2 * | 10/2006 | Frazier | 137/312 |

* cited by examiner

*Primary Examiner*—Kevin L Lee
(74) *Attorney, Agent, or Firm*—Greenberg Traurig, LLP

(57) ABSTRACT

A battery spill containment system and method are provided for containing a hazardous spilled substance from at least one industrial battery in service as a back-up power supply. The system comprises a containment rail system to define a perimeter to accommodate the at least one industrial battery; a flexible liner for placement within the perimeter defined by the containment rail system, the flexible liner having a base and an edge, wherein the edge rises at least about four inches above the base, the flexible liner being resistant to damage from the spilled substance; and a material for placement within the perimeter defined by the containment rail system, the material to absorb and chemically neutralize the spilled substance from the at least one industrial battery so that the hazardous nature of the spilled substance to humans or material structures is reduced, wherein the containment rail system is mounted to the floor whereby battery lifting equipment can be used to access the at least one industrial battery for servicing or replacement.

19 Claims, 30 Drawing Sheets

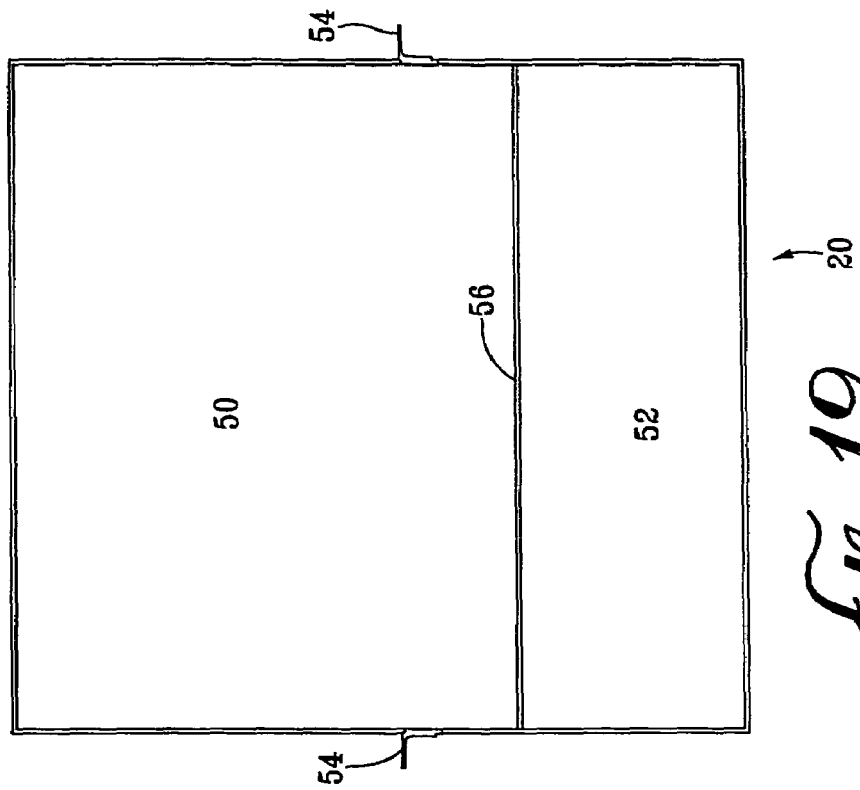
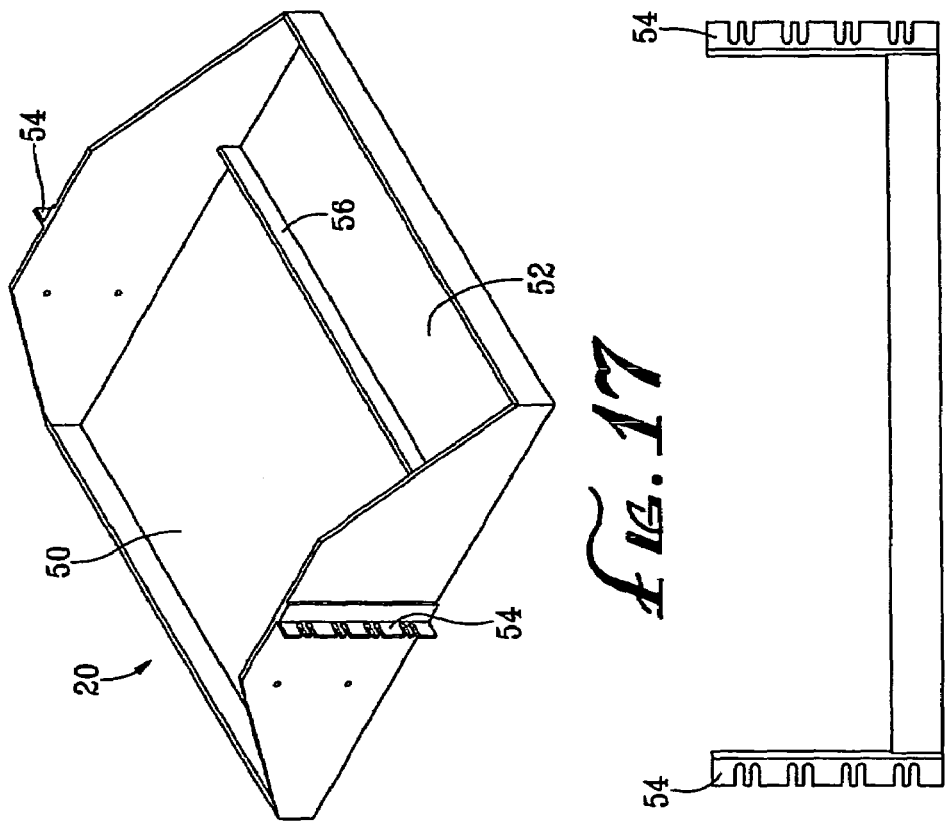
Fig. 17
Fig. 18
Fig. 19

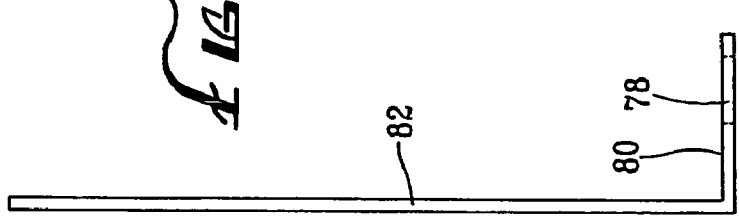
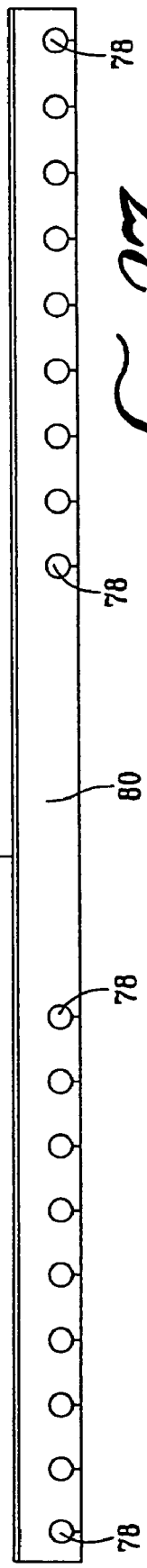
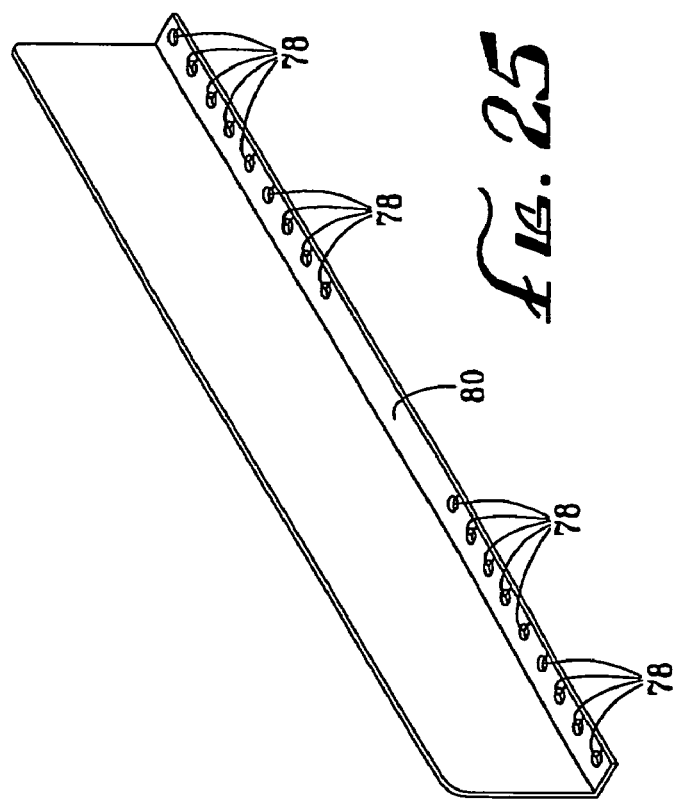

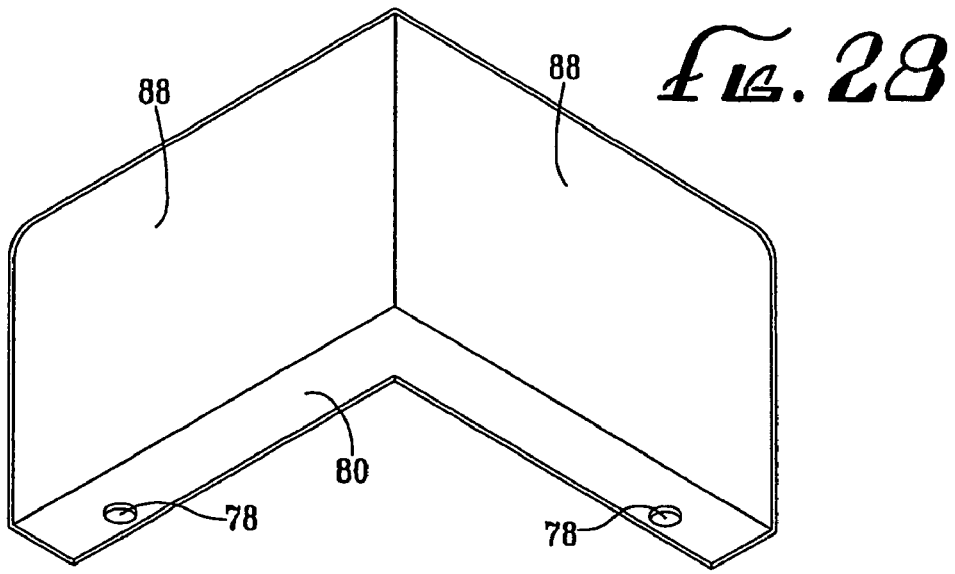
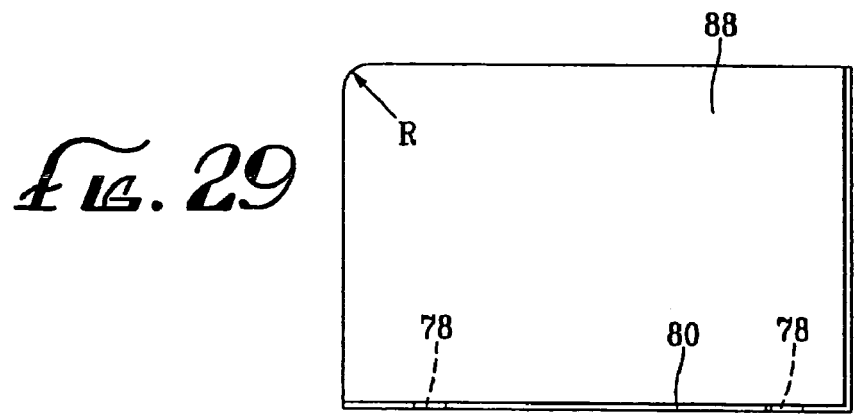
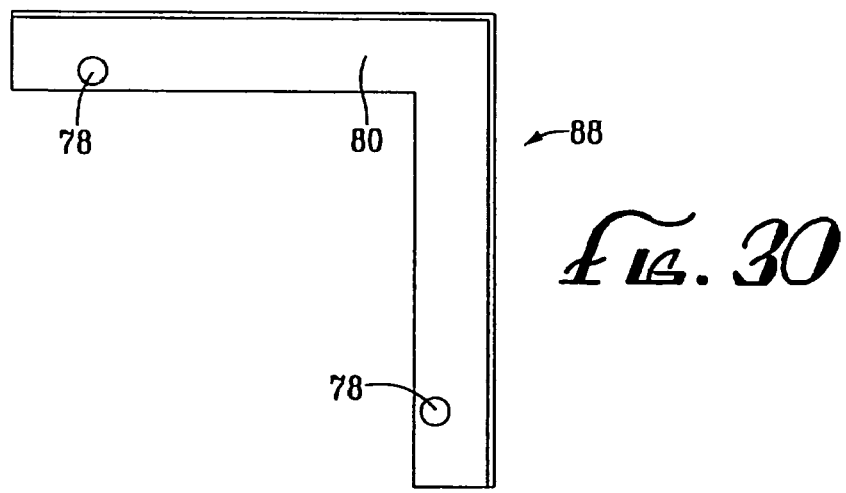

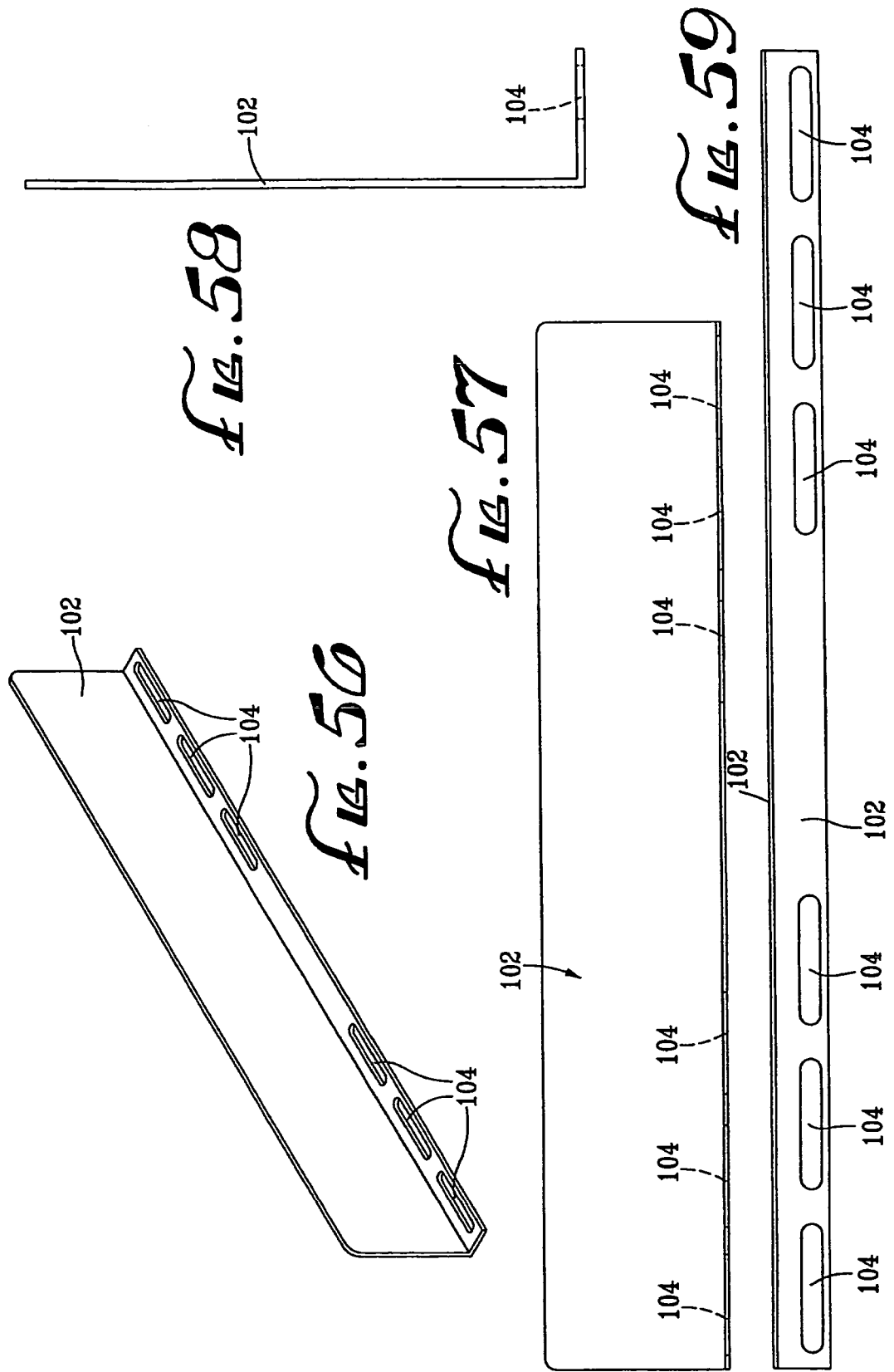

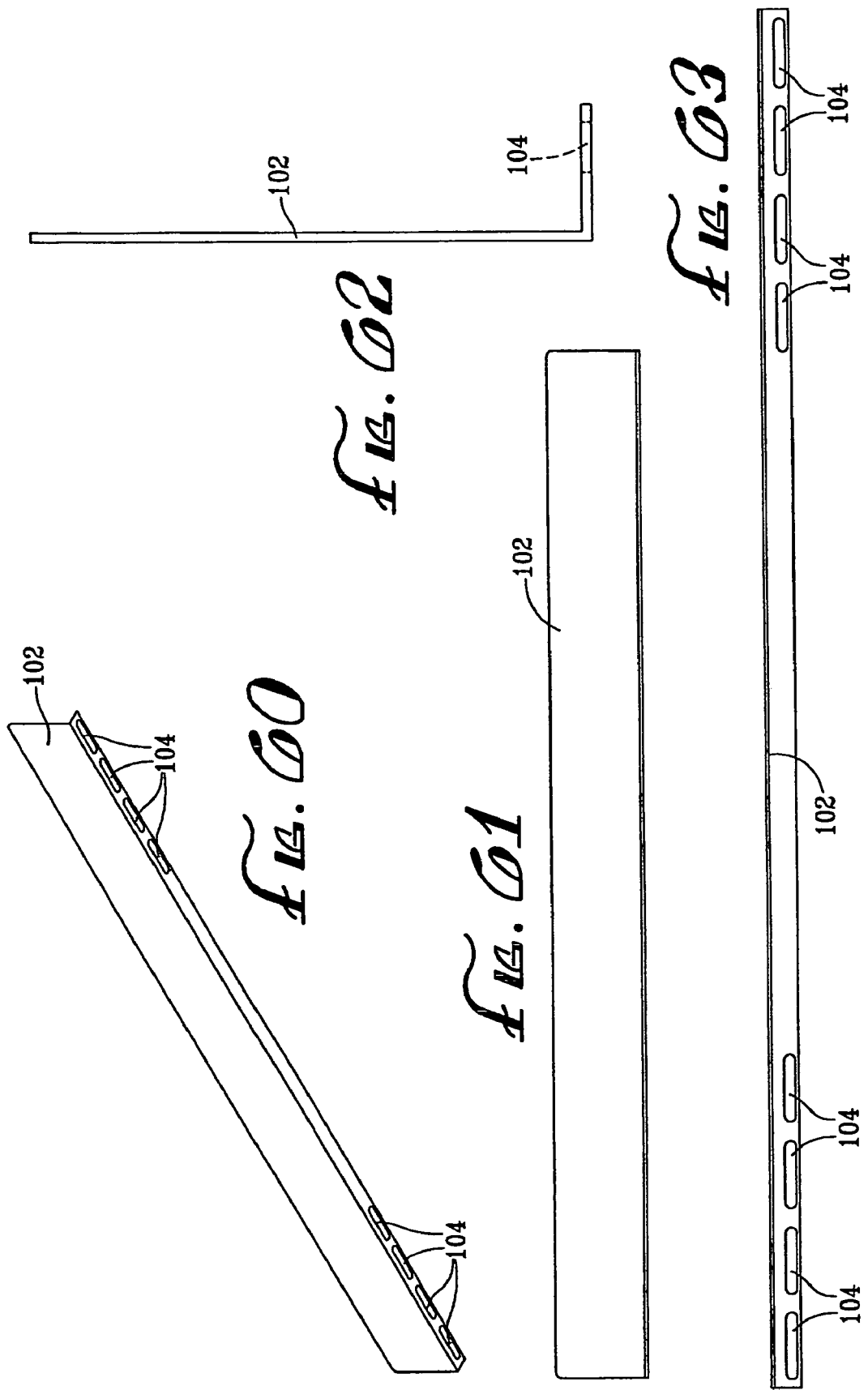

SPILL CONTAINMENT SYSTEM AND METHOD

RELATED APPLICATION(S)

This application is a continuation of U.S. patent application Ser. No. 09/960,759, filed on Sep. 21, 2001 now U.S. Pat. No. 7,124,771 which is, in turn, a continuation of U.S. patent application Ser. No. 09/428,192, filed on Oct. 27, 1999, now issued under U.S. Pat. No. 6,308,728, which are fully incorporated herein by reference.

FIELD OF THE INVENTION

The field of the invention is spill containment systems and methods, and more particularly, is systems and methods for containing, neutralizing and/or monitoring spills from batteries or other devices.

BACKGROUND

In our industrial society, devices often contain substances that may leak or spill undesirably onto other devices, personnel, or the environment. For example, batteries may be stored on battery racks where the batteries serve as a backup power supply for data communication centers and computers. These batteries may contain acid that may leak or spill onto other batteries, cables, equipment, and other devices as well as personnel, thereby posing a hazard to people and property. Sulfuric acid, commonly found in batteries, is an extremely hazardous material regulated by the federal, state and local governments. With respect to batteries, Article 64 of the Uniform Building Code requires a four-inch high containment barrier with an acid neutralization capability to a pH of 7-9. Similarly, other devices may need containment systems. Such devices include but are not limited to air conditioning units that may drip water from condensation or leak freon, or water heaters that may leak water.

Regardless of the device and the substance that may leak, it is desirable to contain leaks and spills. It is further desirable to neutralize and absorb the leaks and spills to prevent the leaks and spills from spreading. Finally, it is desirable to have a system that not only detects leaks, but also indicates whether a leak has occurred.

SUMMARY

A battery spill containment system and method are provided for containing a hazardous spilled substance from at least one industrial battery in service as a back-up power supply. The system comprises a containment rail system to define a perimeter to accommodate the at least one industrial battery; a flexible liner for placement within the perimeter defined by the containment rail system, the flexible liner having a base and an edge, wherein the edge rises at least about four inches above the base, the flexible liner being resistant to damage from the spilled substance; and a material for placement within the perimeter defined by the containment rail system, the material to absorb and chemically neutralize the spilled substance from the at least one industrial battery so that the hazardous nature of the spilled substance to humans or material structures is reduced, wherein the containment rail system is mounted to the floor whereby battery lifting equipment can be used to access the at least one industrial battery for servicing or replacement.

BRIEF DESCRIPTION OF THE DRAWINGS

FIG. 17 is a perspective view of a containment rail system.

FIG. 18 is a front edge view of the containment rail system of FIG. 17.

FIG. 19 is a top view of the containment rail system of FIG. 17.

FIG. 25 is a perspective view of an adjustable containment rail.

FIG. 26 is a side edge view of the containment rail of FIG. 25.

FIG. 27 is a front view of the containment rail of FIG. 25.

FIG. 28 is a perspective view of a corner containment rail.

FIG. 29 is a front view of the corner containment rail of FIG. 28.

FIG. 30 is a top view of the corner containment rail of FIG. 28.

FIG. 56 is a perspective view of another embodiment of a containment rail having slots.

FIG. 57 is a front view of the containment rail of FIG. 56.

FIG. 58 is a side view of the containment rail of FIG. 56.

FIG. 59 is a top view of the containment rail of FIG. 56.

FIG. 60 is a perspective view of yet another embodiment of containment rail having slots.

FIG. 61 is a front view of the containment rail of FIG. 60.

FIG. 62 is a side view of the containment rail of FIG. 60.

FIG. 63 is a top view of the containment rail of FIG. 60.

DETAILED DESCRIPTION

The subject invention is a spill containment system and method.

Figure 1:
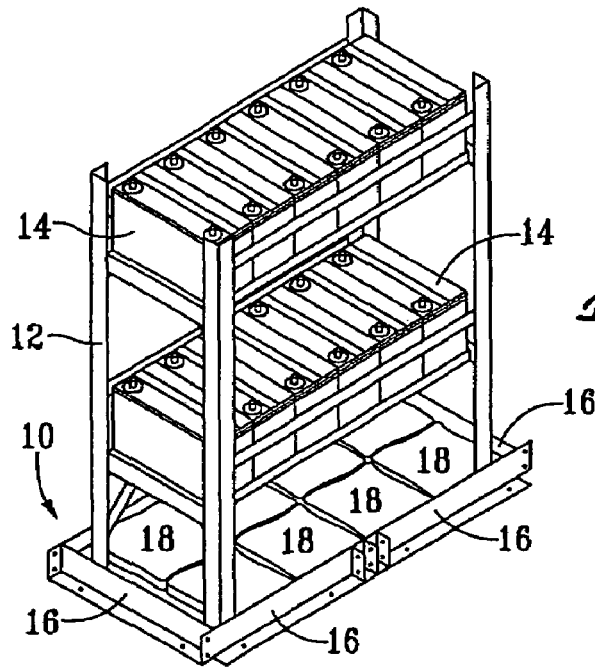
FIG. 1 is a perspective view of a spill containment system for stationary batteries.

FIG. 1 is a perspective view of a spill containment system and battery rack for stationary batteries. The spill containment system 10 is mounted below a battery rack 12 that supports a plurality of batteries 14. The spill containment system 10 includes containment barriers 16 that are mounted to each other and to the floor with concrete floor anchors. Contained within the perimeter of the containment rails 16 are pillows 18. The pillows absorb spills and/or neutralize the spilled material. For example, in this particular embodiment of a containment system directed to battery spills, the pillows 18 absorb and neutralize the acid spilled from batteries 14 so that the acid does not leak onto the floor. The system prevents the acid from leaking onto the floor in order to prevent a hazardous situation for employees who may slip and fall, or burn themselves on the acid, as well as to prevent the acid from damaging nearby property and devices such as computers. Often the batteries serve as a backup energy source for computers, telecommunications and data management systems, so it is important that spilled battery acid does not damage nearby cables and computers.

Figure 2:
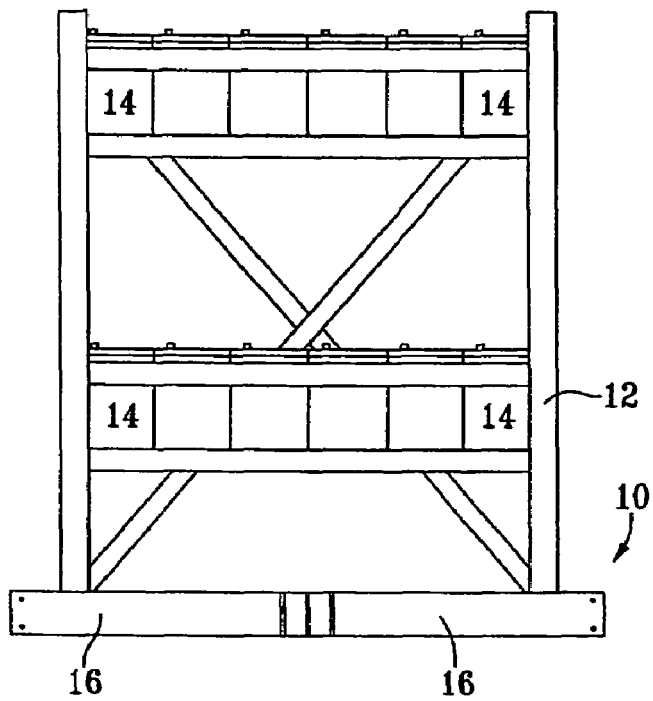
FIG. 2 is a front view of the battery spill containment system of FIG. 1.
Figure 3:
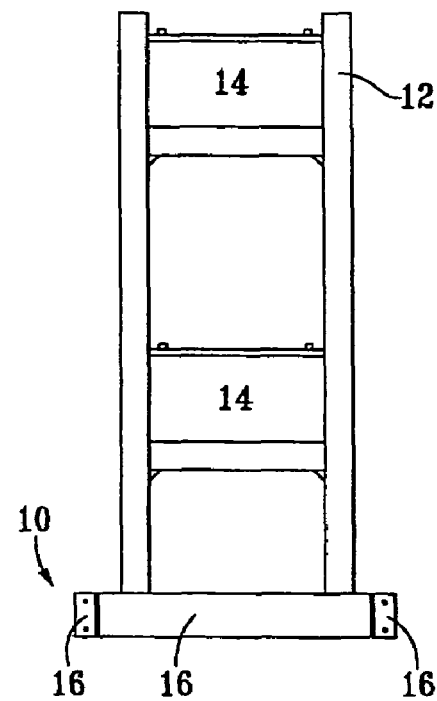
FIG. 3 is a side view of the battery spill containment system of FIG. 1.

FIGS. 2 and 3 are the front and side views of the battery spill containment system of FIG. 1 respectively.

Figure 4:
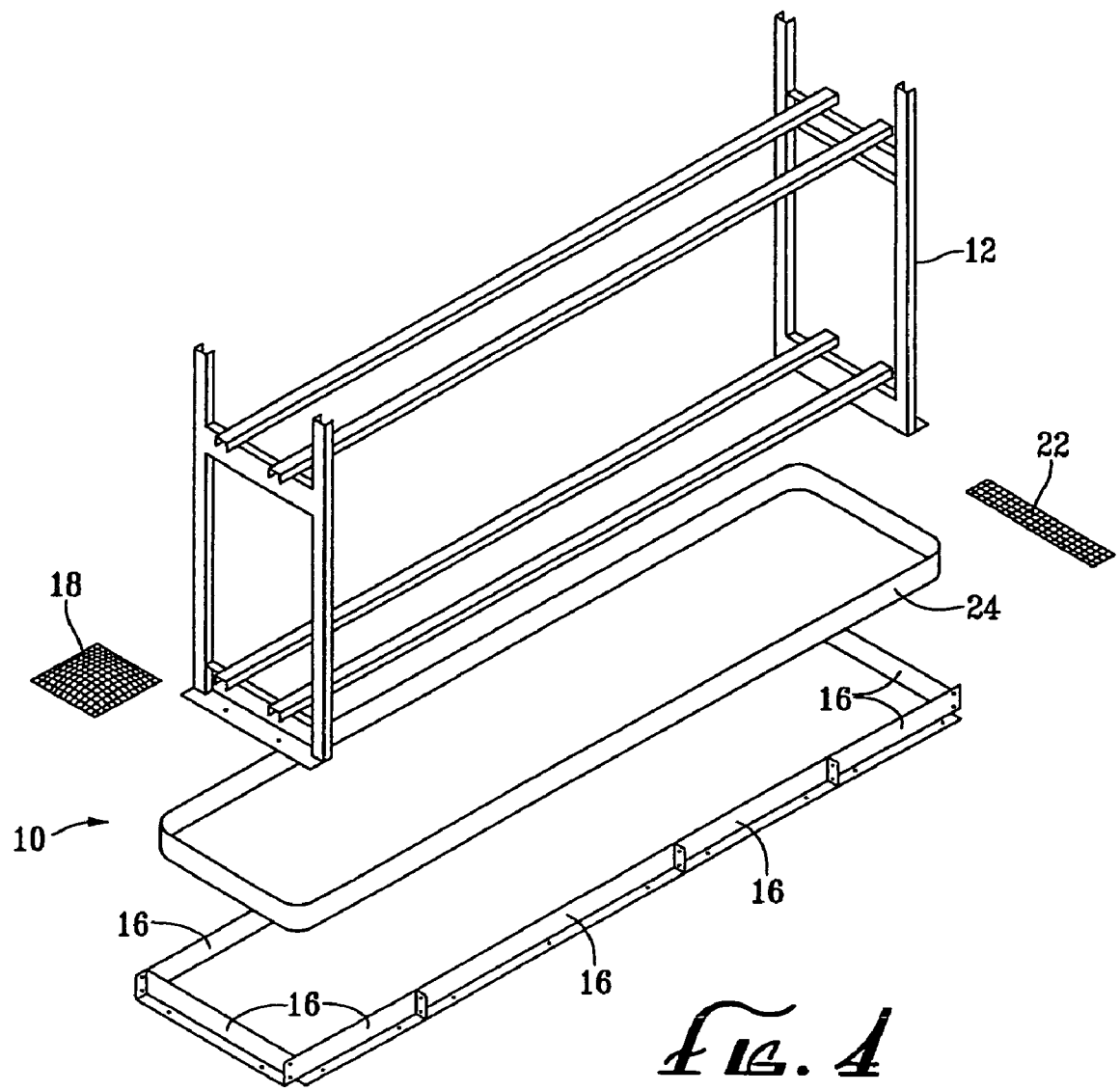
FIG. 4 is an exploded piece-part drawing of the major components of a battery spill containment system and a battery rack.

FIG. 4 is an exploded piece-part drawing of the major components of a battery spill containment system 10 and a battery rack 12. A containment rail system 20 is anchored to the floor. In this particular embodiment in FIG. 4, the containment rail system 20 comprises a plurality of containment rails 16 that are mounted to each other and to the floor. In a preferred embodiment, the containment rails 16 are constructed out of 16 gauge sheet metal and coated with a material to make them resistant to and less likely to be damaged by the spilled material. For example, the containment rails 16 may be preferably coated with a layer of polyvinylchloride ("PVC") to a thickness of 10-15 millimeters or epoxy paint. It is further preferable that all surfaces of the containment rails 16 be coated by PVC or epoxy paint. For instance, even the holes in the containment rails 16 may be coated by PVC. Alternatively, the containment rails may be epoxy painted instead of PVC coated. Also alternatively, the components of each embodiment described in this patent specification may be fabricated out of metal, plastic, polypropylene, or other suitable materials. The containment rail system may be a bright safety yellow per OSHA standards.

An optional corrosion resistant liner 24 may be inserted into the containment rail system 20. In particular, the corrosion resistant liner 24 is preferably fabricated of PVC with dielectric welded or thermal welded seams. For example, the material of the liner 24 may be coated with PVC on one side over a polyester web. As another example, the liner 24 may be fabricated out of a PVC thermoplastic material available as model C3000 (or C3 membrane) sold by Cooley Roofing Systems, Inc. (http://www.dupont.com/industrialpolymers/roofing/cooley.html) Model C3000 has been used in the roofing industry, but not in spill containment systems. As yet another example, the liner 24 may be fabricated out of a composite material such as a PVC-copolymer alloy composite. An example of a PVC-copolymer alloy is available from IB Roof Systems (http://www.Ibroof.com). Another example is a thirty-two ounce polyurethane available from FOSS Environmental and Infrastructure Inc. in Seattle, Wash. (http://www.fossenv.com). An embodiment of the liner 24 may have a thickness, for example, of 50 to 80 millimeters. Certainly, other thicknesses are permissible.

Alternatively, the liner 24 may be fabricated out of vinyl or any other material that is resistant to damage from the spilled substance. The liner 24 is cut and welded at its seams to form a liner of a desired shape. The liner 24 can be heat welded, or more preferably, dielectrically welded. Preferably, the liner 24 has an edge which rises about four inches to create a containment perimeter. The corrosion resistant liner 24 is preferably placed within the perimeter formed by the containment rail system 20, although the liner 24 could be mounted to the containment rail system 20 or be formed integral with the containment rail system 20. The battery rack 12 is then placed in the liner 24, mounted through the liner 24 to the containment rail system 20, or mounted through the liner 24 to the floor directly. Pillows 18 and socks 22 are optionally placed in the liner 24. If a liner 24 is not used, the optional pillows 18 and socks 22 may be placed within the perimeter formed by the containment rail system 20. Batteries may then be stored on the battery rack 12.

Figure 64:
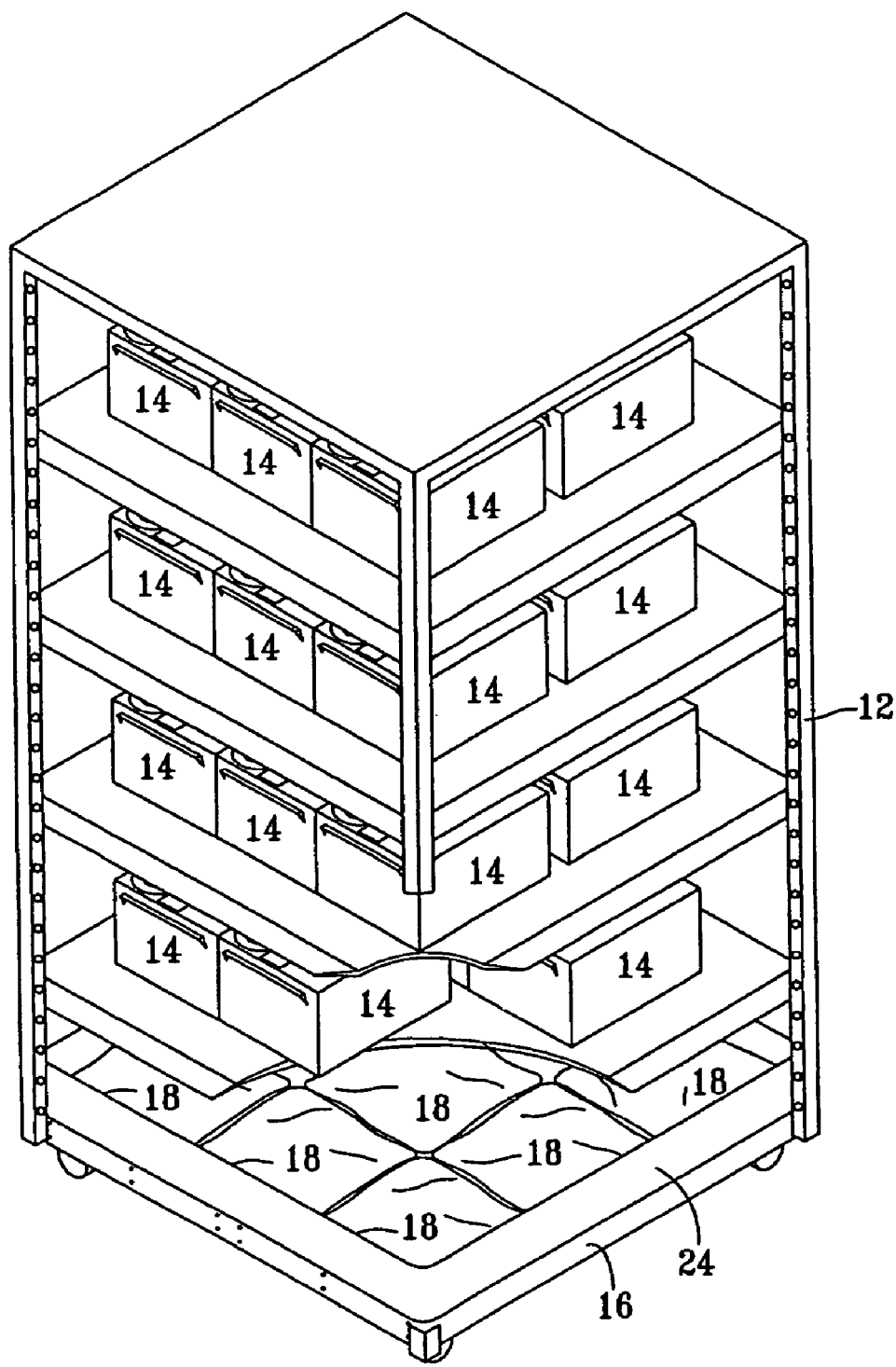
FIG. 64 is a perspective view of a containment system for batteries which illustrates the use of a liner and pillows.

FIG. 64 illustrates a battery spill containment system which includes a battery rack 12 having multiple shelves to hold the batteries 14. The system further includes a liner 24 placed within the perimeter formed by the containment rails 16. Spill neutralizing and absorbing pillows 18 are placed in the liner 24.

Figure 5:
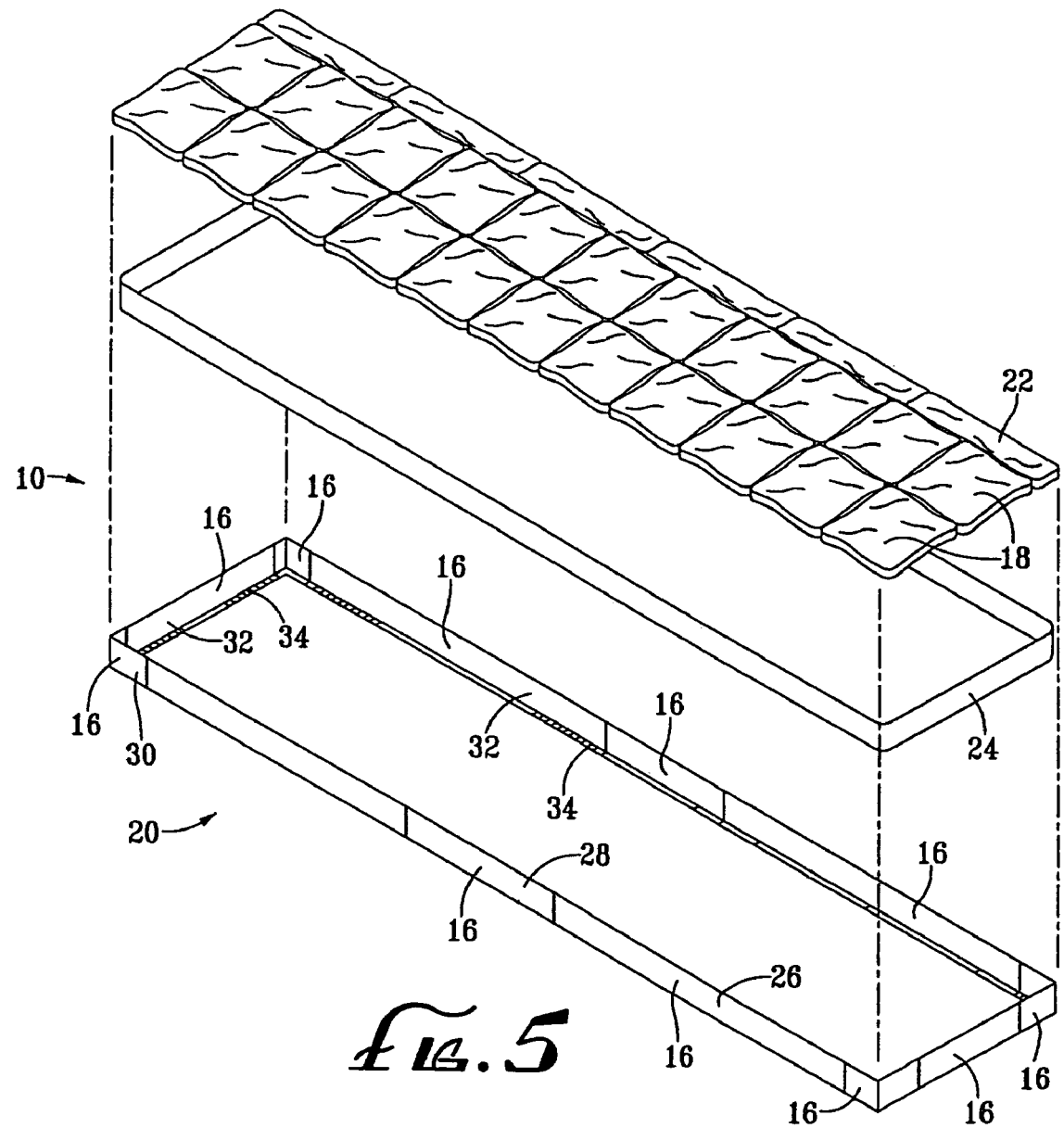
FIG. 5 is an exploded piece-part drawing of a battery spill containment system.

FIG. 5 is an exploded piece-part drawing of a battery spill containment system that illustrates that the system may be configured to have any desired shape or size. As can be seen in FIG. 5, the containment rail system 20 comprises a variety of containment rails 16. Containment rails 16 themselves may have different sizes, shapes and configurations and are described in greater detail later in this patent specification.

The corners and edges of each containment rail may be rounded if desired. As with any of the embodiments of any of the components or systems described in this patent specification, the dimensions, size, shape and/or configuration of each particular component or the entire system may be changed as desired for the particular application. For example, FIG. 5 illustrates long containment rails 26, short containment rails 28, corner containment rails 30, and adjustable containment rails 32. The adjustable containment rails 32 have a plurality of mounting holes 34 that allow the installer to adjust the size, shape and configuration of the containment rail system 20 by selecting the mounting hole to use. In the particular embodiment of FIG. 5, both pillows 18 and socks 22 are used. However, any of the systems described in this patent specification may use only pillows, only socks, neither pillows nor socks, or both.

Figure 6:
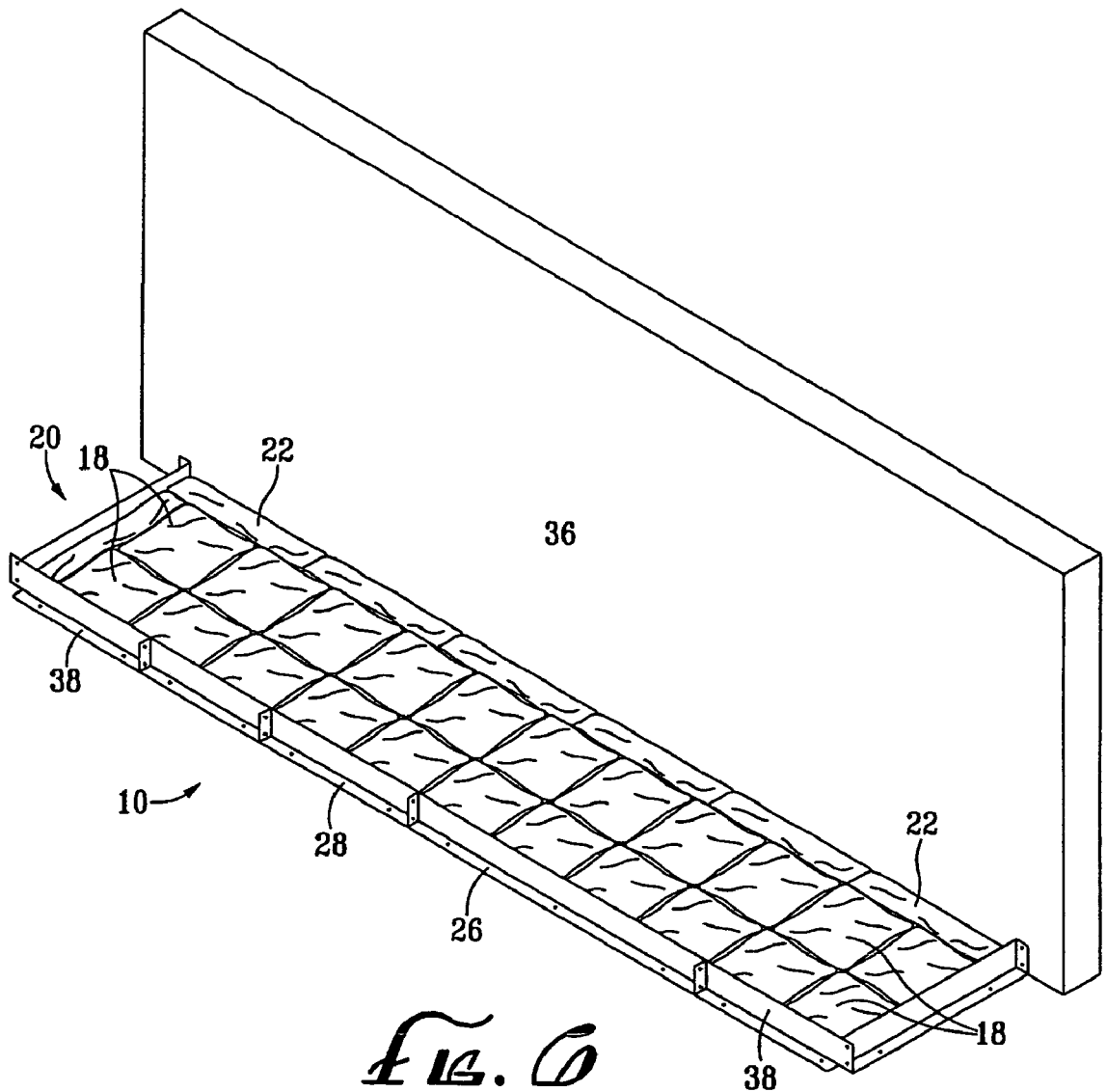
FIG. 6 is a battery spill containment system formed in a rectangular shape.

FIG. 6 is a battery spill containment system that is attached to a wall 36. The system is formed in a rectangular shape. In the particular example of FIG. 6, the containment rail system 20 comprises long containment rails 26, short containment rails 28 and notched containment rails 38. The purpose of the notch 110 is described below with respect to FIG. 8.

Figure 7:
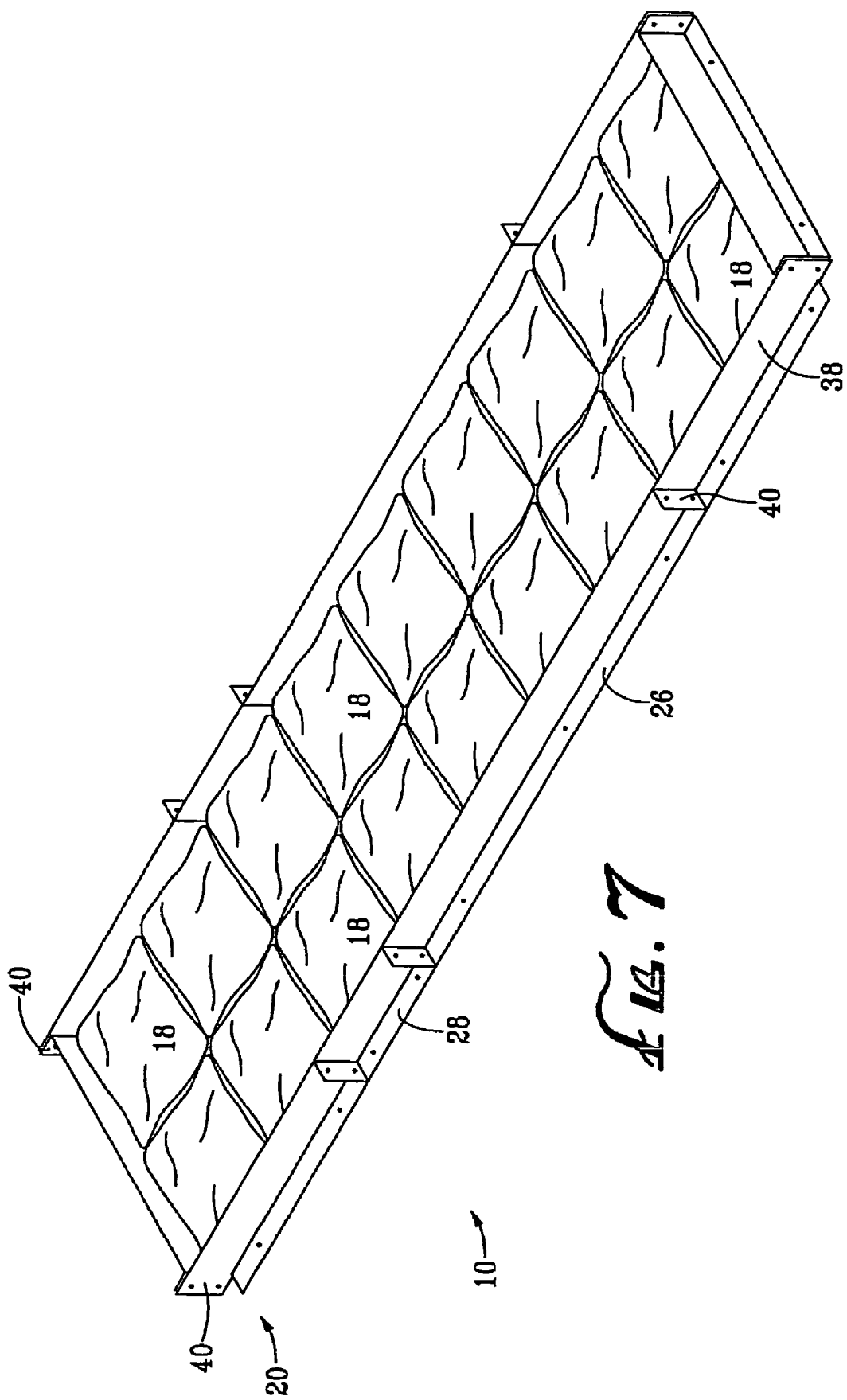
FIG. 7 is a battery spill containment system formed in another rectangular shape.

FIG. 7 is a battery spill containment system formed in another rectangular shape. In the particular example of FIG. 7, the containment rail system 20 comprises long containment rails 26, short containment rails 28 and notched containment rails 38. The purpose of the notch 110 is described below with respect to FIG. 8. Further, this example embodiment uses pillows 18 only.

Figure 8:
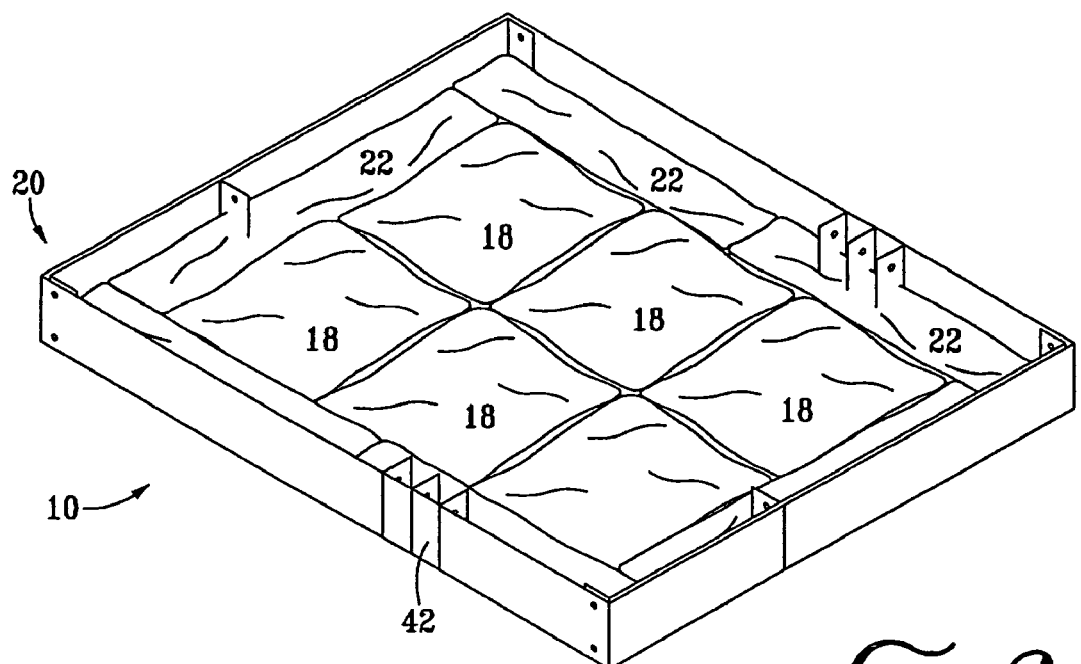
FIG. 8 is a battery spill containment system formed in yet another rectangular shape.

FIG. 8 is a battery spill containment system formed in yet another rectangular shape. This system is inverted such that the flanges protrude inward toward the rack. As a result, the inverted system has smooth outer surfaces which increases the aisle width and does not interfere with surrounding equipment or personnel. By contrast, for example, the system of FIG. 7 has flanges 40 that jut outwardly. The notch 110 permits the building of an inverted containment rail system shown in FIG. 8 where the exterior surfaces of the containment rail system are smooth. Smooth exterior surfaces may be desirable to reduce the hazard of tripping personnel who walk by the system. As illustrated, pillows 18 and socks 22 may be selected to fill the containment rail system 20 as desired.

Figure 9:
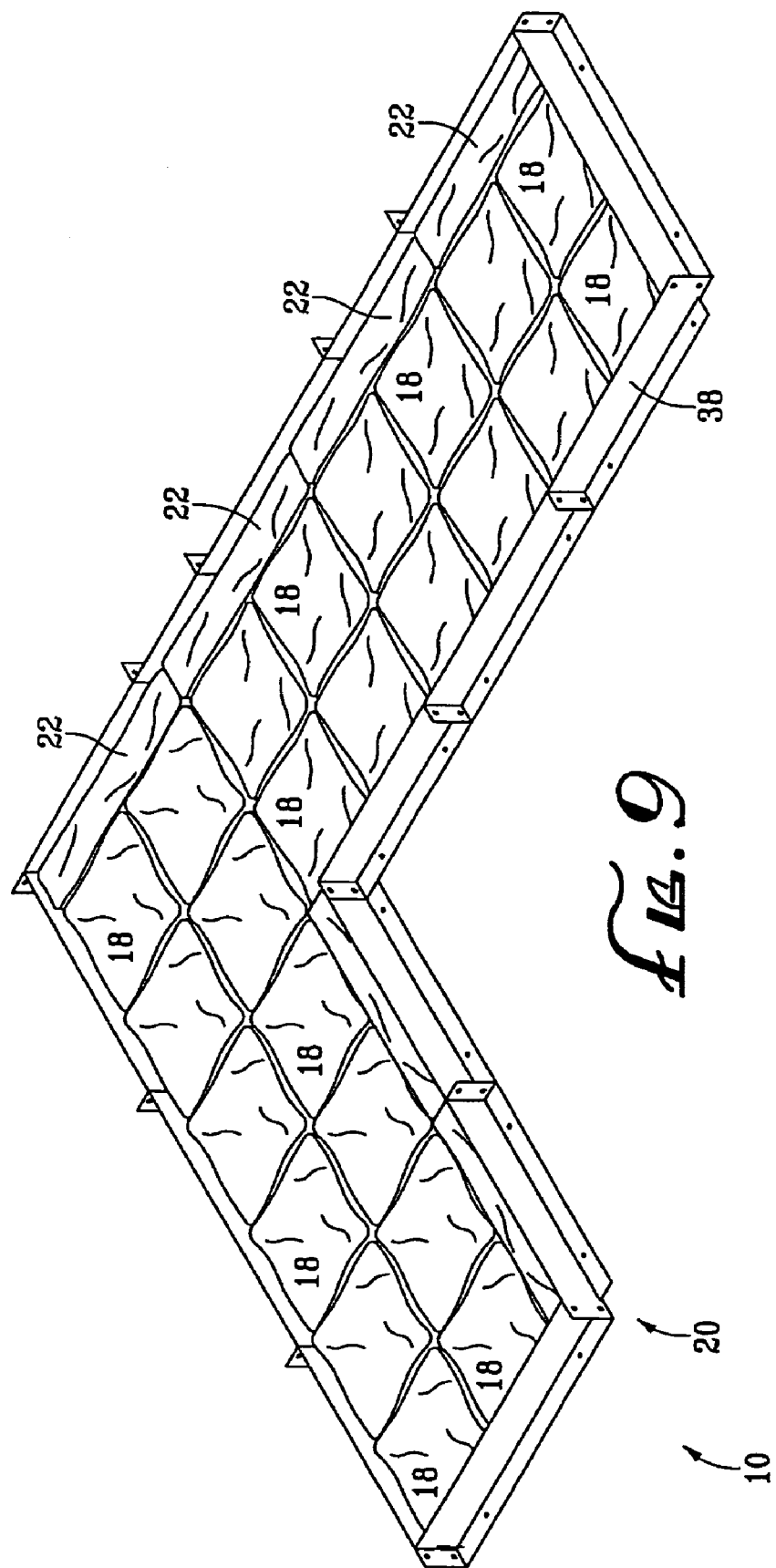
FIG. 9 is a battery spill containment system formed in an L-shape.
Figure 10:
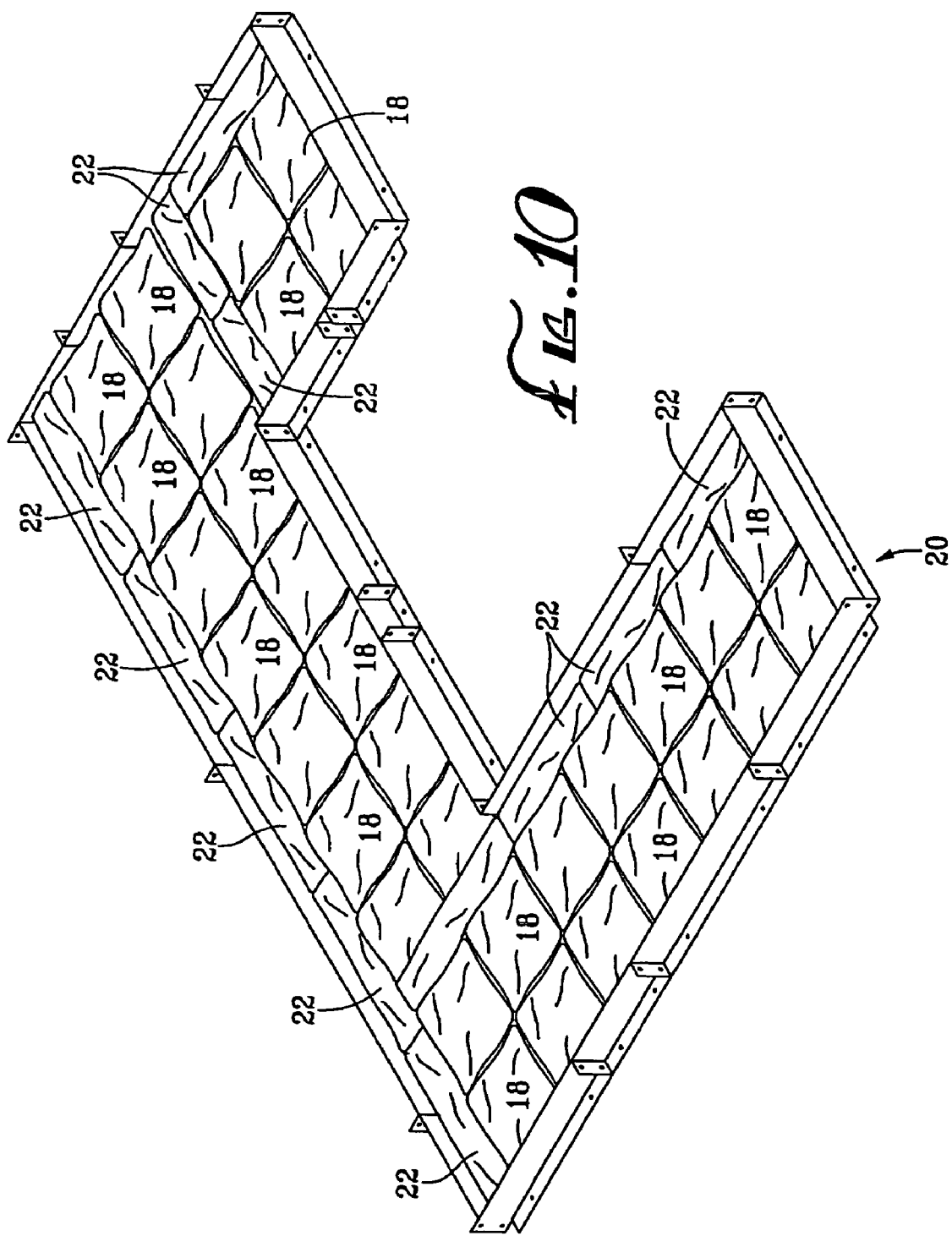
FIG. 10 is a battery spill containment system formed in a U-shape.
Figure 11:
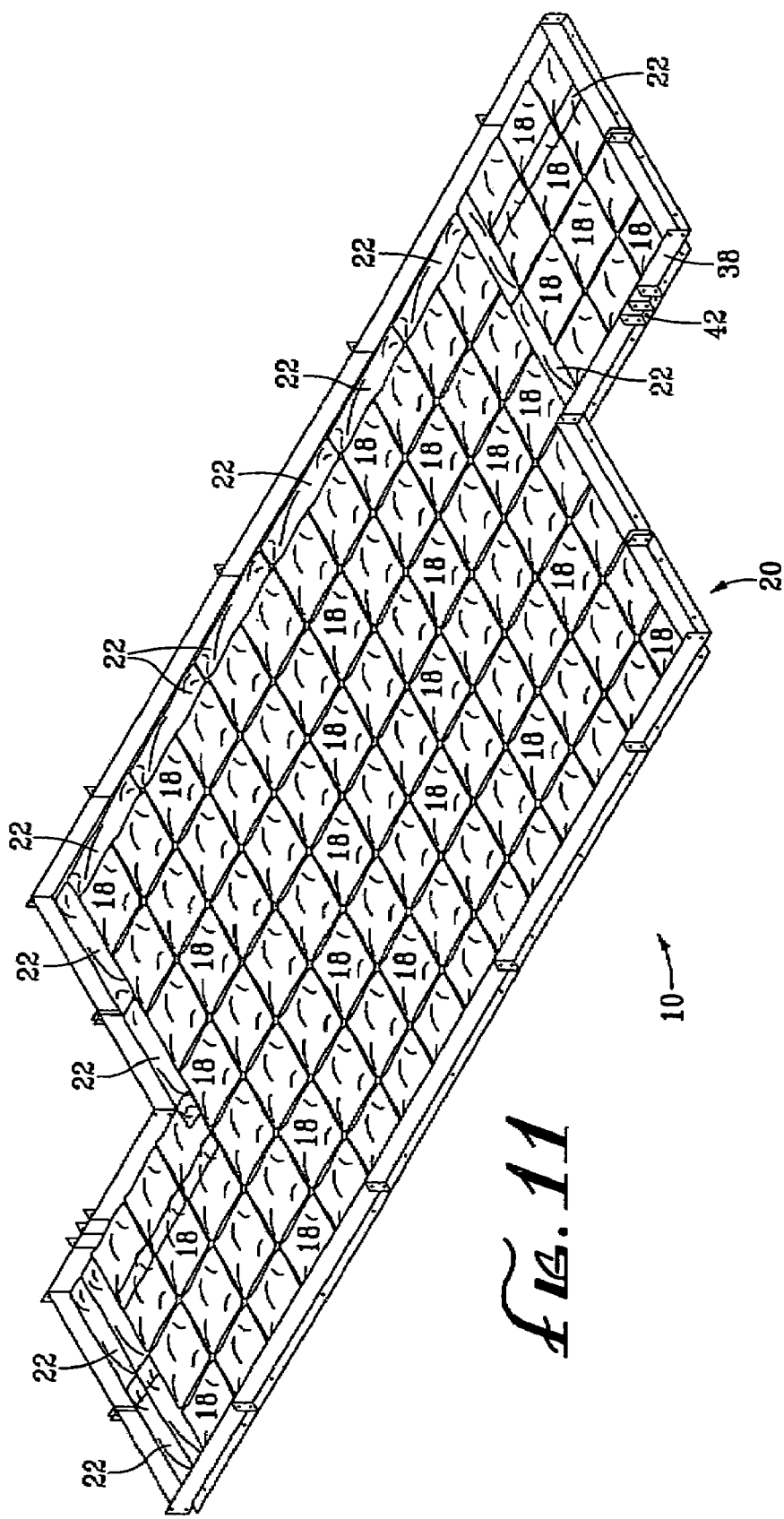
FIG. 11 is a battery spill containment system formed in another shape.

Advantageously, the spill containment system 10 may be configured to have any desired shape or size. FIG. 9 is a battery spill containment system formed in an L-shape. FIG. 10 is a battery spill containment system formed in a U-shape. FIG. 11 is a battery spill containment system formed in yet another shape. Again, any configuration of pillows 18 and socks 22 may optionally be used to suit the size, shape and configuration of the containment rail system 20.

Figure 12:
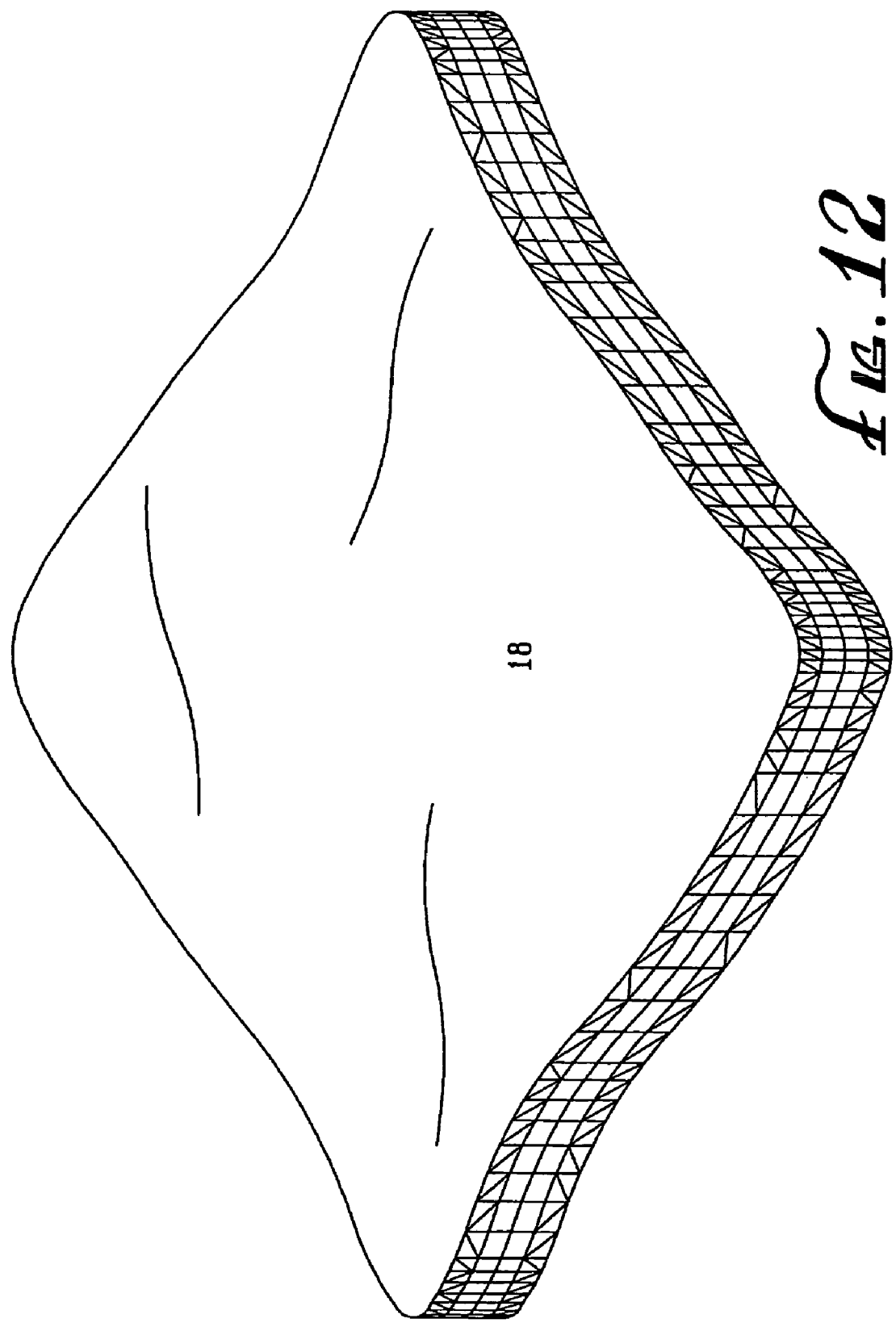
FIG. 12 is a perspective view of a pillow.
Figure 13:
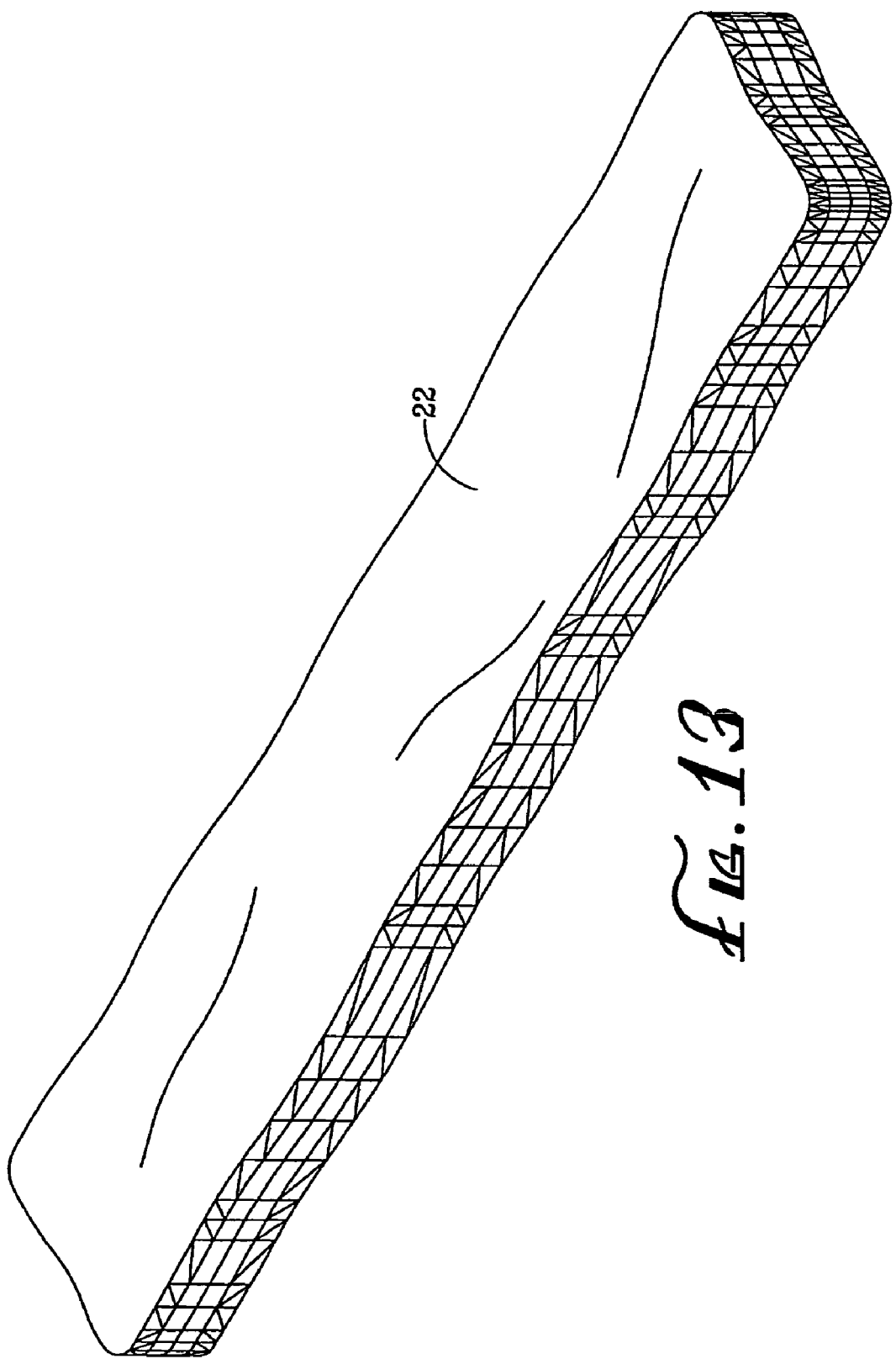
FIG. 13 is a perspective view of a sock.

FIG. 12 is a perspective view of a pillow 18. The pillow 18 is preferably made from spunbound polypropylene material. When exposed to a flame, the pillow 18 also preferably melts instead of ignites. In this particular embodiment, the pillow 18 is fabricated out of a fabric and filled with a neutralizing material such as soda ash blended with an absorbent material such as vermiculite. In the alternative, any caustic base solution may be used. Thus, the pillow absorbs and retains moisture and also neutralizes acids. Optionally, a coloring agent may be added to the pillow 18 so that when acid contacts the pillow 18, the coloring agent soaks through the polypropylene fabric to alert personnel that an acid spill has occurred. The sock 22, illustrated in FIG. 13, may be fabricated the same as a pillow 18. Each pillow and sock may optionally be marked with an unique serial number for tracking purposes. The weight of a pillow 18, for example, may be 2.8 to 5 ounces, although other weights are certainly allowable.

Figure 14:
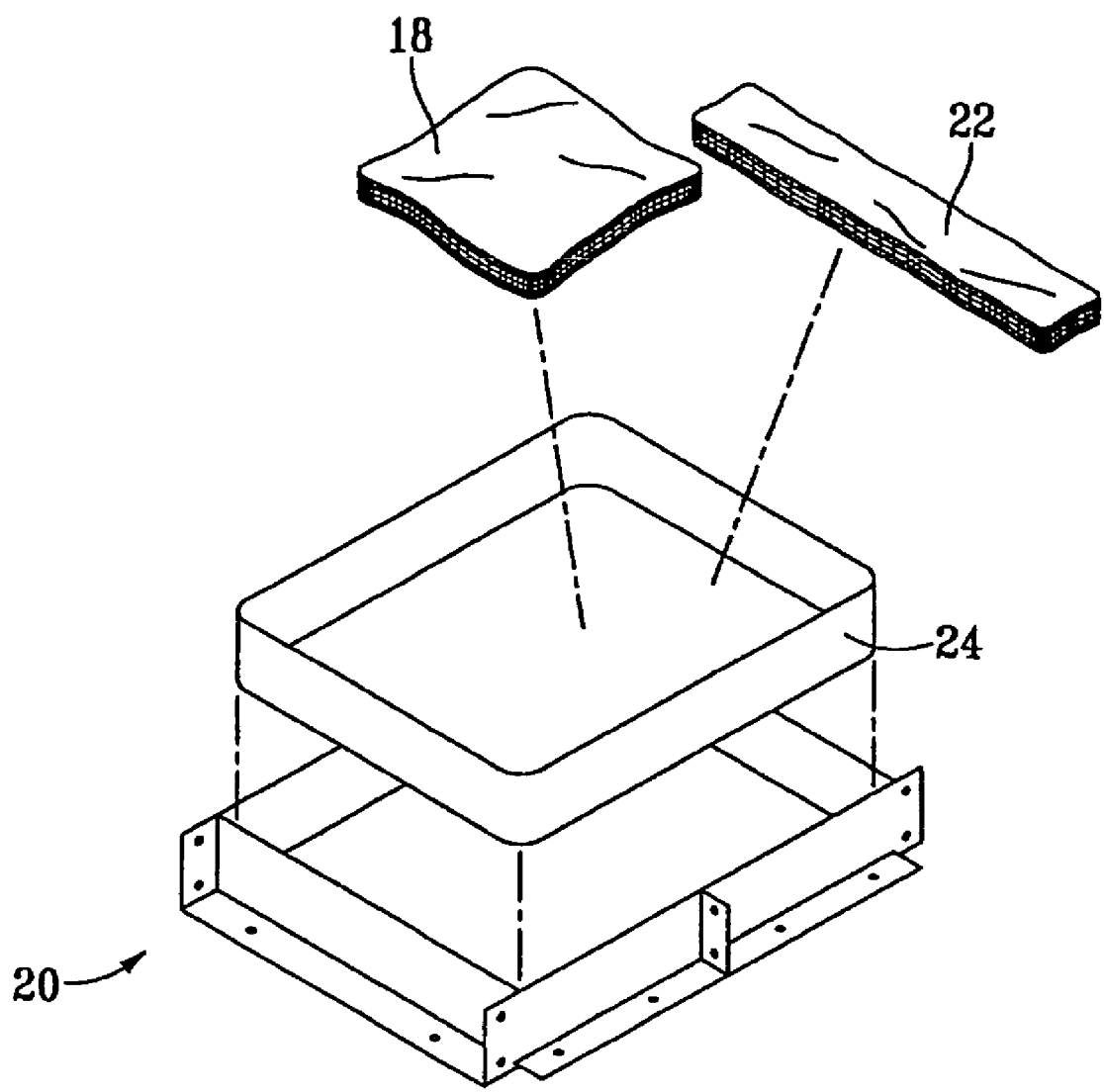
FIG. 14 is an exploded piece-part drawing of a battery spill containment system.

FIG. 14 is an exploded piece-part drawing of a small-sized battery spill containment system. The system comprises a containment rail system 20 formed by containment rails, an optional corrosion resistant liner 24, and an optional pillow 18 and/or sock 22.

Figure 15:
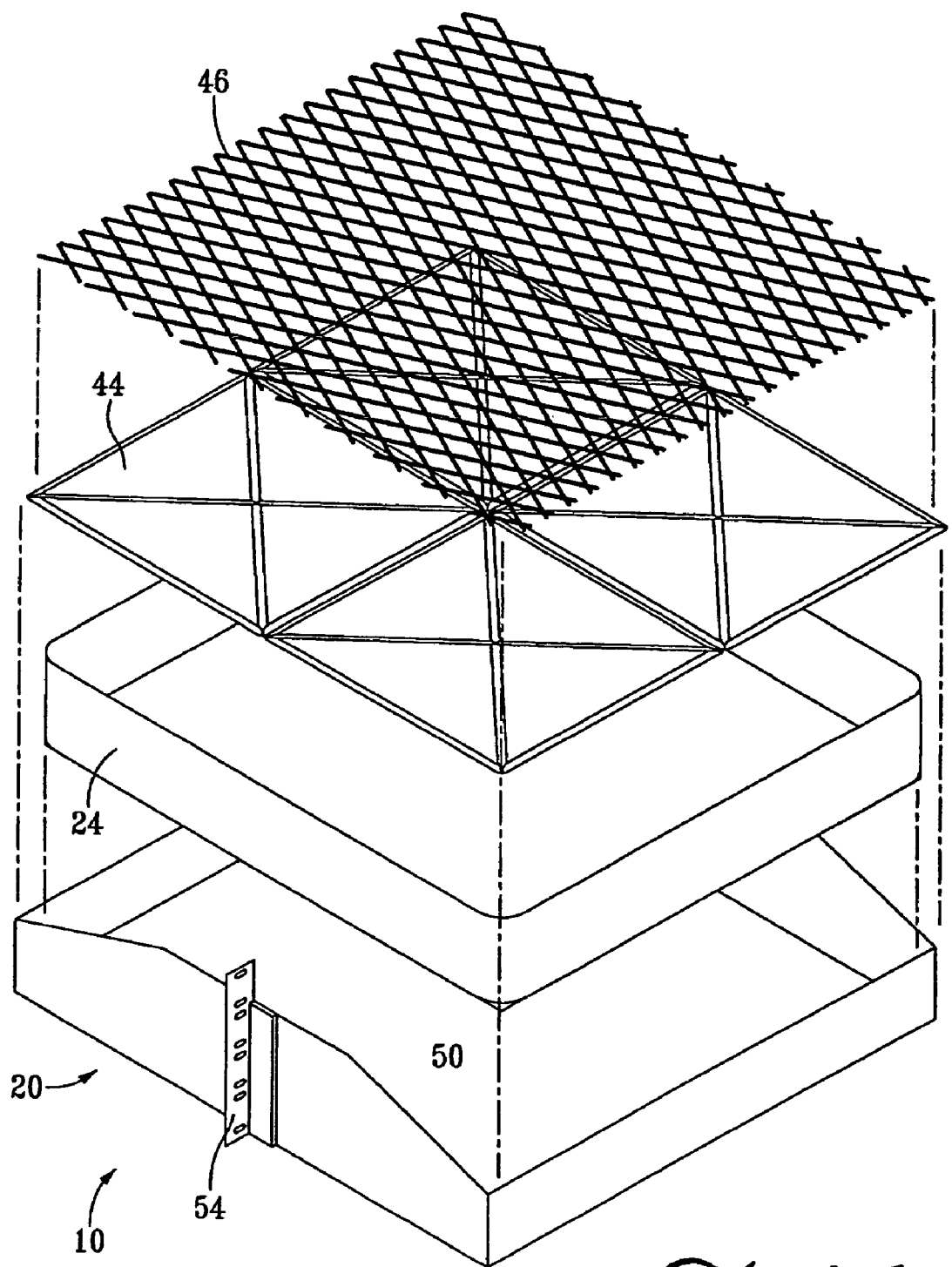
FIG. 15 is an exploded piece-part drawing of a battery spill containment system that uses a pad and grid which sits underneath batteries.
Figure 16:
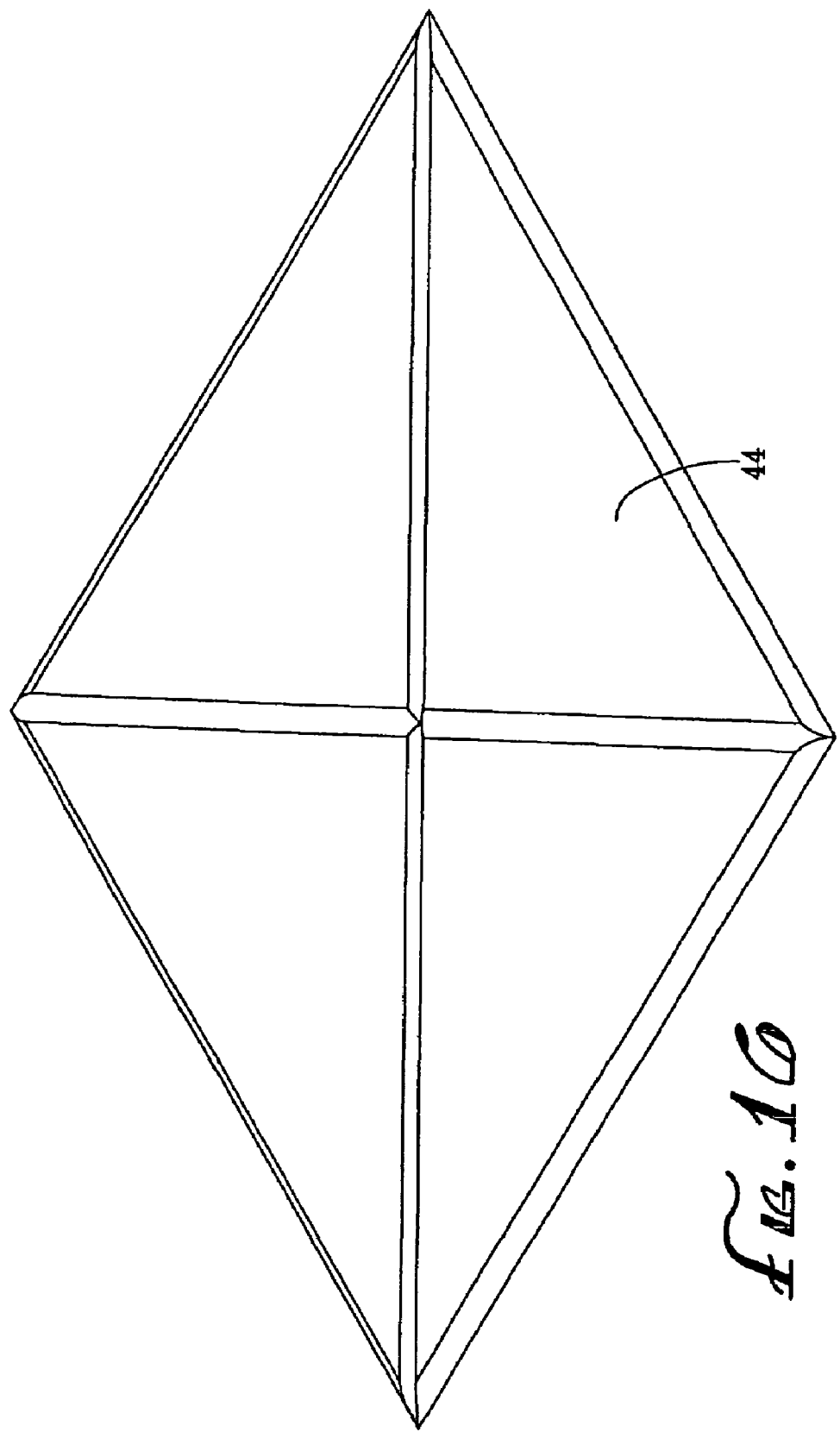
FIG. 16 is a drawing of a pad.

FIG. 15 is an exploded piece-part drawing of a battery spill containment system that uses a pad 44 and optional grid 46. The system comprises a containment rail system 20 formed by containment rails, a corrosion resistant liner 24, a pad 44 and a grid 46. Containment rails are mounted together to form the containment rail system 20. A corrosion resistant liner 24 is optionally inserted into the containment rail system 20. A pad 44, also shown in FIG. 16, is placed into the corrosion resistant liner 24. The pad 44 is made of the same material and serves the same purpose as pillow 18 and sock 22. The pad 44 is essentially a thin pillow 18. The pad 44 is particularly suited for containing spills from valve regulated lead acid (VRLA) batteries because VRLA batteries do not leak as much as some other batteries and thus, the pads do not need to be as thick as the pillows. VRLA batteries do not leak as much because they are typically sealed batteries and contain a gel instead of liquid acid. An optional grid 46 is then placed on top of the pad 44 in order to protect the pad 44 from the battery. The grid 46 may be made of a metal which may be corrugated for strength to hold heavy objects such as a battery. The metal grid also may be PVC coated to make it resistant to the spilled material. Alternatively, the grid 46 may be a perforated PVC sheet where the perforations allow the spilled substance to drip through and onto the pillows.

In this particular embodiment, the containment rail system 20 may have a height of three inches; the liner 24 may have a height of four inches; the pad 44 may have a thickness of a quarter inch; and the grid may be one-sixteenth of an inch thick. Of course, as with any of the embodiments and examples described in this patent specification, the dimensions, size, shape and/or configuration of the spill containment system and any of its components may be changed as desired for the particular application.

FIG. 17 is a perspective closeup view of a containment rail system for a battery. The containment rail system 20 shown in FIG. 17 is an integrally formed structure having compartments such as a compartment 50 to hold a battery or batteries and an optional compartment 52 to hold additional batteries. Compartments 50 and 52 are separated by an optional ridge 56 which creates structural support so that the containment rail system can maintain its shape despite holding heavy batteries. Additional compartments may be added. Flanges 54 allow the containment rail system 20 to be mounted to other structures such as a battery rack. FIGS. 18 and 19 are a front edge view and a top view of the containment rail system of FIG. 17.

Figure 20:
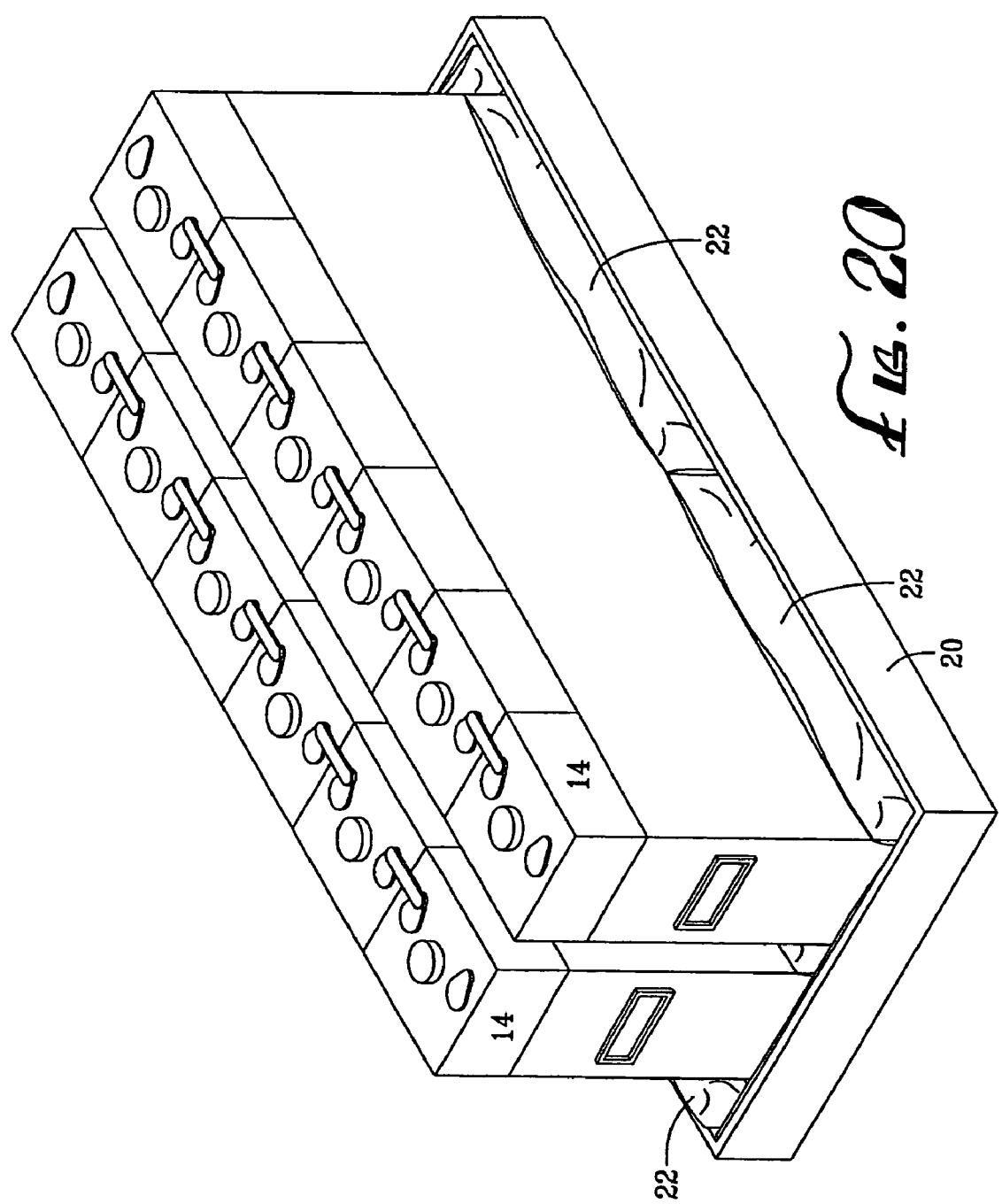
FIG. 20 is a perspective view of a battery spill containment system with batteries.

FIG. 20 is a perspective view of a battery spill containment system 10 that is holding batteries 14. As shown, the batteries rest on and are surrounded by socks 22. Alternatively, the socks 22 could be placed in any manner adjacent to the batteries 14.

Figure 21:
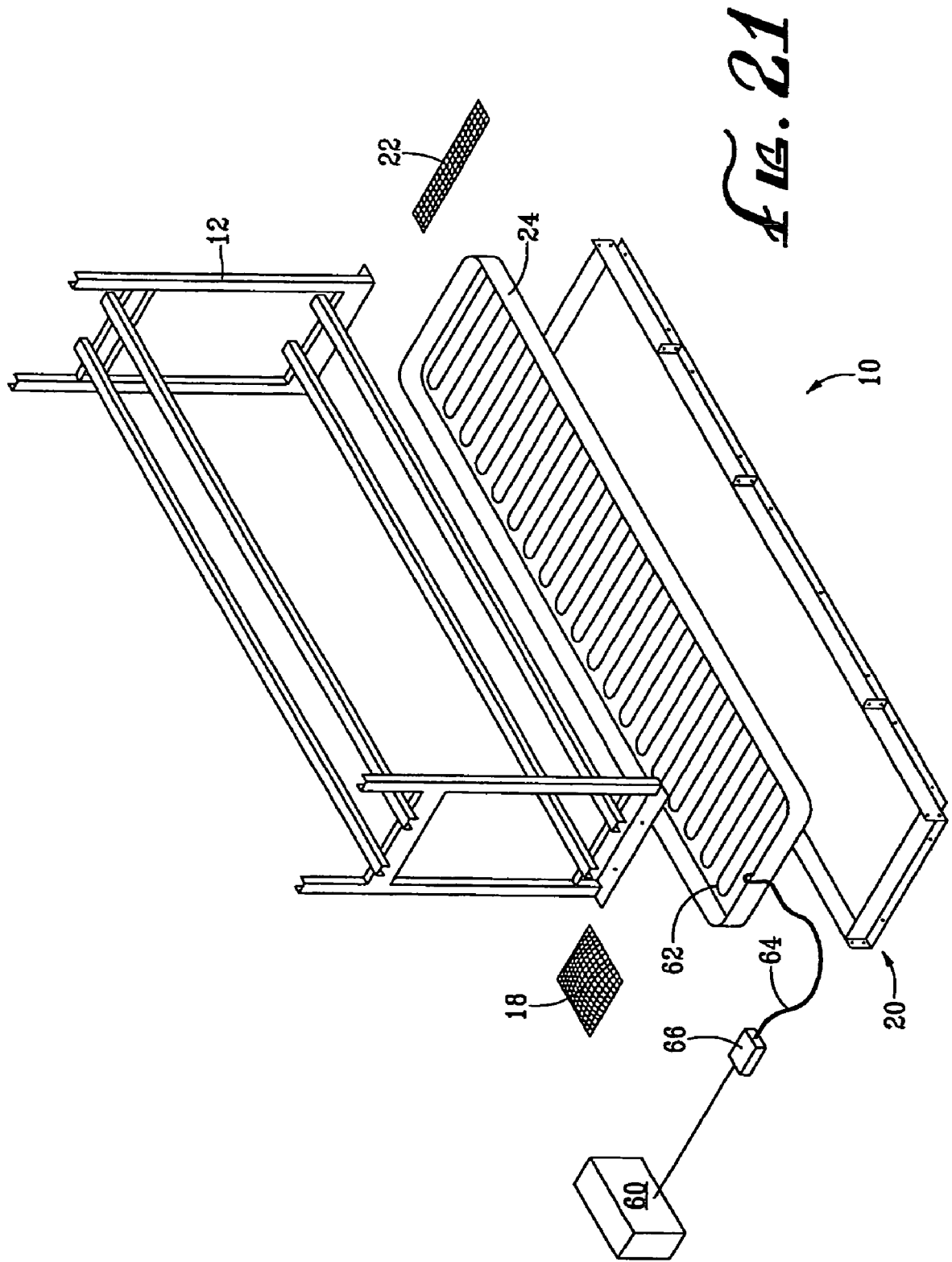
FIG. 21 is an exploded piece-part view of a battery spill containment system, a leak detection device and a battery rack.

Additional features are possible. For example, a leak detection device 60 may detect and indicate whether a leak or spill from a device has occurred. FIG. 21 is an exploded piece-part view of a battery spill containment system 10, a leak detection device 60 and a battery rack 12. The containment rail system 20 may be any of the containment rail systems described in this patent specification. Preferably, the containment rail system 20 is mounted to the floor. A corrosion resistant membrane or liner 24 is inserted into the containment rail system

20. A leak detection device 60 comprises a leak detector 62, a lead 64 and a leak indicator 66. The leak detector 62 may use any of a variety of known methods to detect the presence of a leak or spill of any substance including water and acids. For example, one embodiment of the leak detector 62 is now described. In this example embodiment, the leak detector 62 may be a cotton sleeve that holds two conductor strands in close proximity to each other. Each of the conductor strands is wrapped by a braided fiberglass material so that the two conductor strands are not shorted together. One end of the two-conductor sleeve system is split so that one conductor connects to one end of a 3.9M ohm resistor while the other conductor connects to the other end of the resistor. The other end of the two-conductor sleeve system is also split where one conductor goes to a first lug inside the leak indicator 66 and the other conductor goes to a second lug inside the leak detector 66. Specifically, one embodiment of conductors uses seven conductors, 728 stranded, 20 aug. A current flows through the circuit formed by the two conductors and the resistor to the leak indicator 66. The cotton sleeve acts as a wick to draw fluids and liquids to the two conductors. Fluids that reach the conductors pass through the fiberglass material and contact the conductors, causing the conductors to short together. The shorting of the conductors decreases the effective resistance and increases the current flow. When the leak indicator 66 detects an increase in current or a decrease in resistance across the first and second lugs, the leak indicator 66 determines that a leak or spill has occurred. The leak detector 62 preferably is able to detect leaks or spills that fall anywhere on liner 24. For example, the leak detector 62 may be in a coil or zigzag shape to cover a large area of the liner 24. Other configurations are possible and included within the scope of this invention. The leak detector 62 may be embedded into the liner 24 or simply rest on its surface. The leak detector 62 passes information about the presence or absence of a spill through a lead 64 to leak indicator 66. The leak indicator 66 indicates to personnel whether a spill or leak has occurred, through for example, an audible or visual alarm, or any other known mechanism for indicating the presence or absence of a condition. The leak detector 66 may optionally have a plurality of states that indicate the amount of spillage. For instance, if the leak detector 66 is based on an audible or visual alarm, the leak detector 66 may increase its audible alarm or flash more lights as the amount of spillage increases. Still further, the leak detector 66 may not only serve monitoring and indication functions, but also communication functions. For example, the leak detector 66 may communicate by radio frequency signals, infrared light, data over a fax/modem line, data over a telephone or other data line, or a direct connection to a fire alarm, security guard station, or other alarming/monitoring systems. The leak detector 66 may have an electrical connection that permits (e.g., a dry "C" contact) customer communication with the site. Still alternatively, when the leak detector 66 detects a spill, or alternatively a severe enough spill, the leak detector 66 may cause certain events to occur, including but not limited to the issuance of an alarm to the proper personnel, the shutting off of equipment, or the diversion of power resources to other non-leaking batteries. The leak detection device 60 may be powered by AC current, its own battery source, or one of the batteries in the battery rack.

Figure 22:
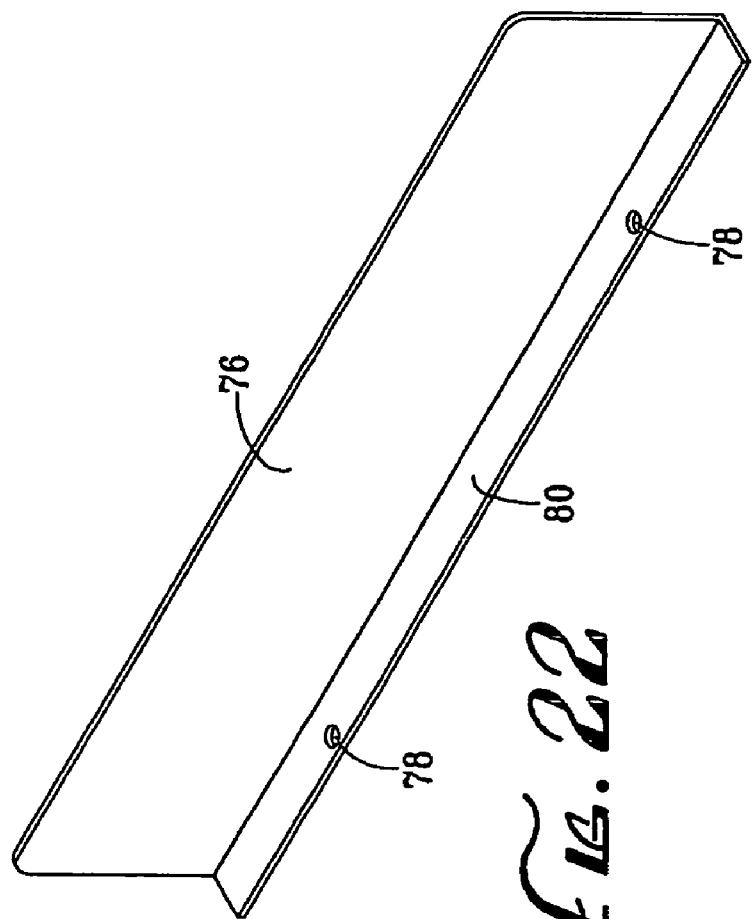
FIG. 22 is a perspective view of a containment rail.
Figure 23:
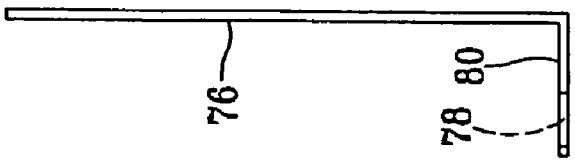
FIG. 23 is a side edge view of the containment rail of FIG. 22.
Figure 24:
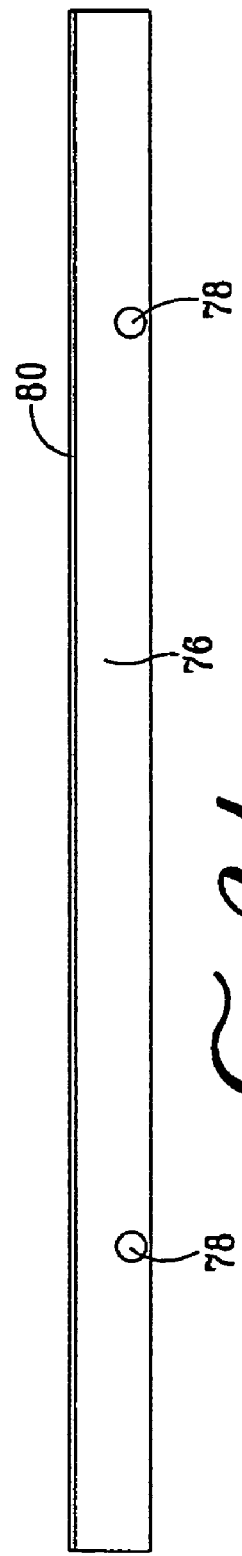
FIG. 24 is a front view of the containment rail of FIG. 22.

We now turn to the components that form a containment rail system 20. FIGS. 22-24 are a perspective view, a side edge view and a front view of a containment rail respectively. The containment rail 76 has a mounting flange 80 that has at least one hole 78. The hole 78 allows a screw, nail, or any other mounting device to mount the containment rail 76 to the floor or other structure. Of course, any of the dimension, size, shape and configuration of the containment rail may be changed to suit the particular application. The number of holes may be increased or decreased. If the mounting procedure relies on adhesive, the containment rail 76 may require no holes.

The containment rail 76 may be an adjustable containment rail 82, as shown in FIGS. 25-27. The adjustable containment rail 82 has a mounting flange 80 that has a plurality of holes 78. Each of the plurality of holes 78 is spaced from its neighboring hole by either a uniform amount or a non-uniform amount. Preferably, the plurality of holes 78 are spaced apart by a uniform amount so that the adjustable containment rails may be used to form a containment rail system of predetermined dimensions.

A corner containment rail is illustrated in FIGS. 28-30. The corner containment rail 88 may be used to form the corner of a containment rail system 20. The corner containment rail 88 has a mounting flange 80 and mounting holes 78. The corner containment rail may be a ninety degree corner, a sixty degree corner, a forty-five degree corner, or any other corner as desired. Again, as with any of the embodiments of any of the components or systems described in this patent specification, the dimensions, size, shape and/or configuration of the particular corner containment rail may be changed as desired for the particular application.

Figure 31:
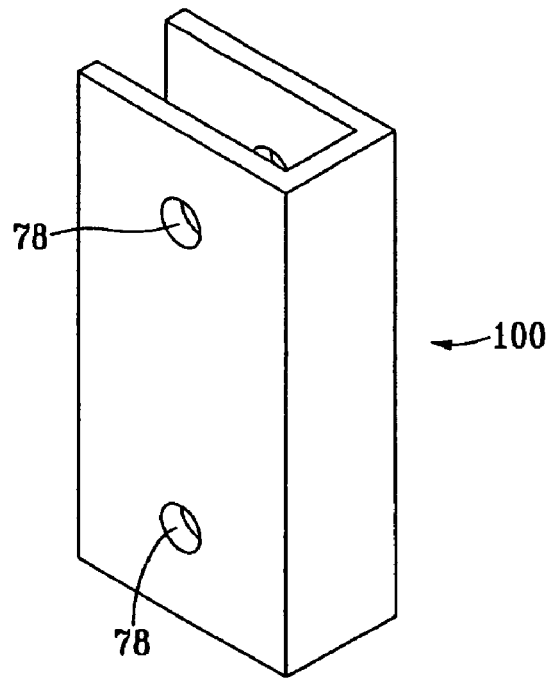
FIG. 31 is a perspective view of a containment rail.
Figure 32:
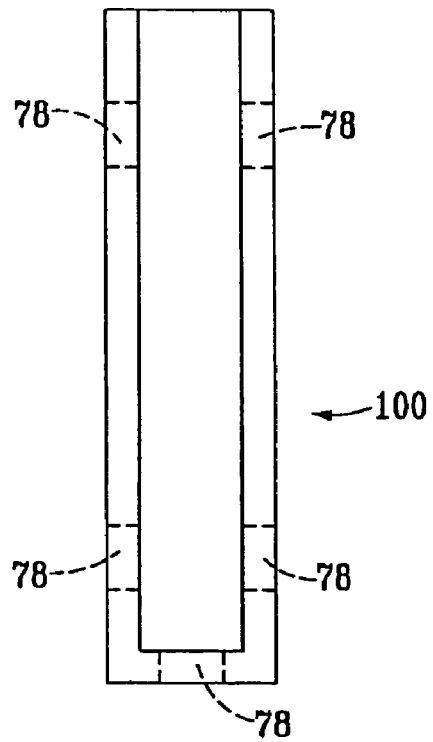
FIG. 32 is a front view of the containment rail of FIG. 31.
Figure 33:
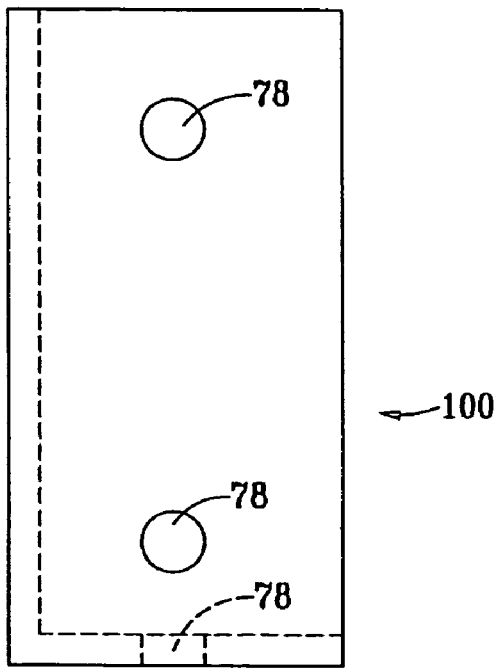
FIG. 33 is a side view of the containment rail of FIG. 31.
Figure 34:
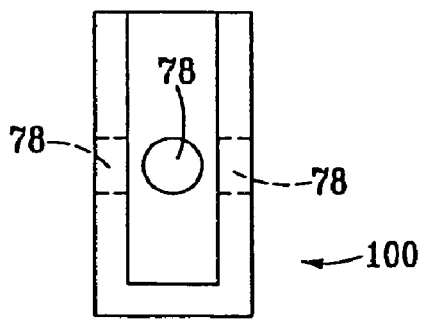
FIG. 34 is a top view of the containment rail of FIG. 31.
Figure 35:
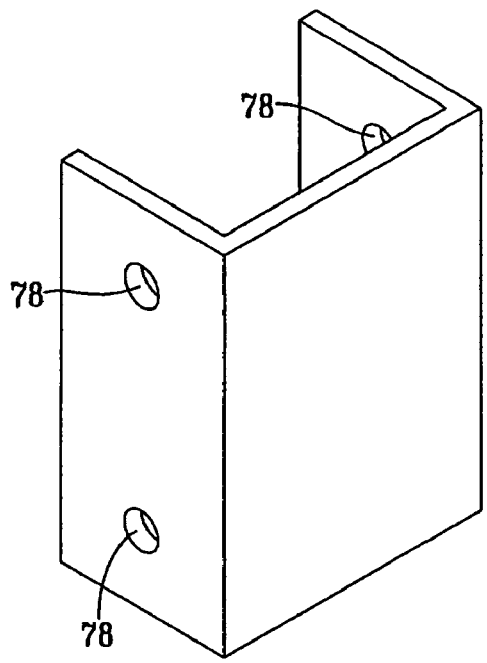
FIG. 35 is a perspective view of a containment rail having a different dimension than the containment rail of FIG. 31.
Figure 36:
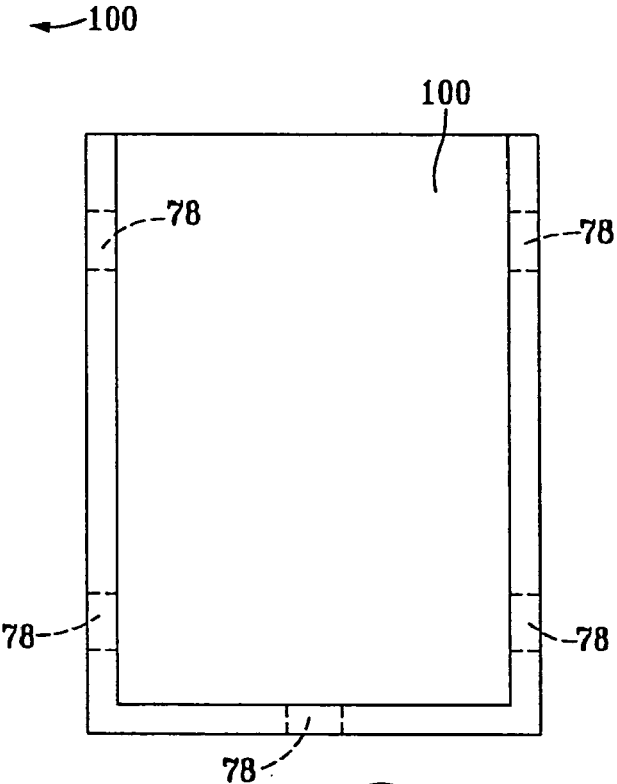
FIG. 36 is a front view of the containment rail of FIG. 35.
Figure 37:
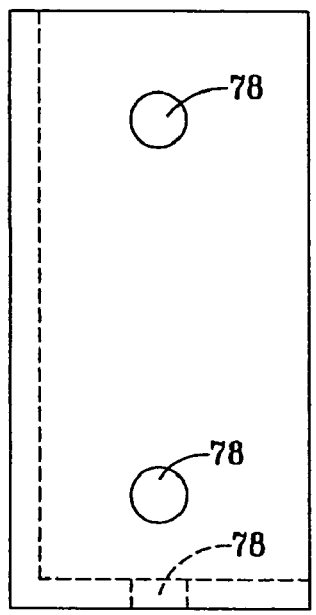
FIG. 37 is a side view of the containment rail of FIG. 35.
Figure 38:
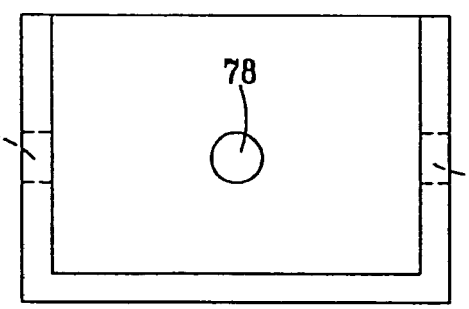
FIG. 38 is a top view of the containment rail of FIG. 35.
Figure 39:
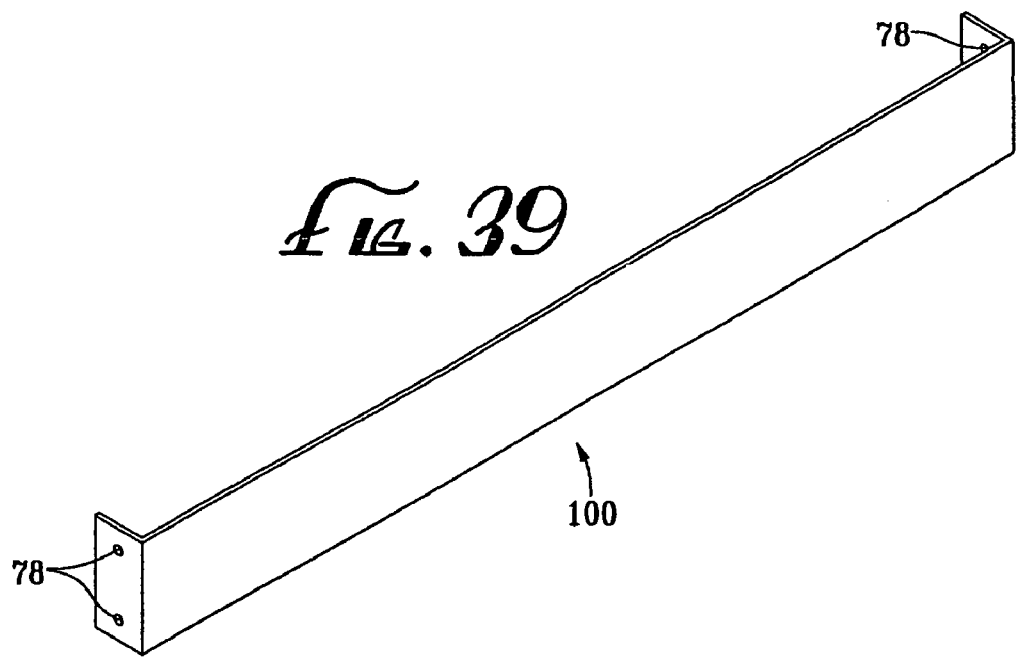
FIG. 39 is a perspective view of a containment rail having a different dimension than the containment rails of FIGS. 31 and 35.
Figure 40:
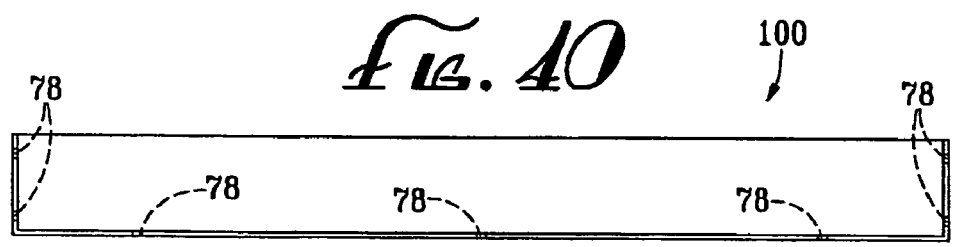
FIG. 40 is a front view of the containment rail of FIG. 39.
Figure 41:
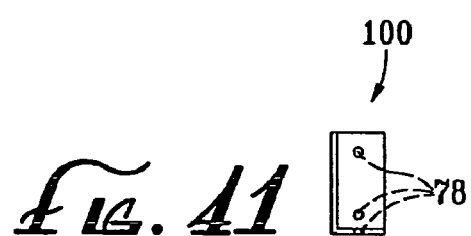
FIG. 41 is a side view of the containment rail of FIG. 39.
Figure 42:
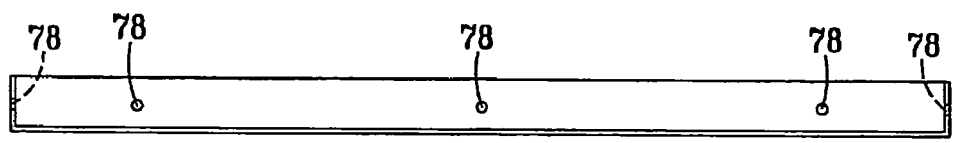
FIG. 42 is a top view of the containment rail of FIG. 39.
Figure 43:
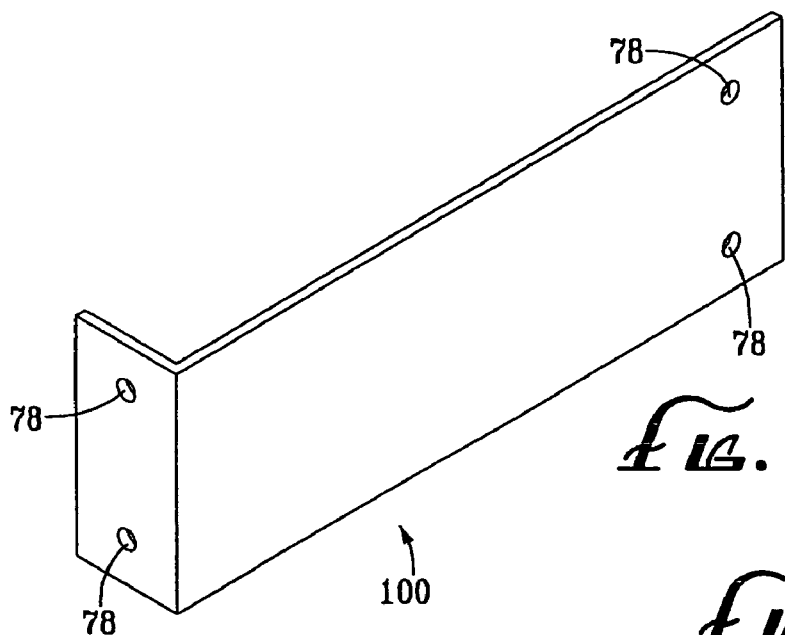
FIG. 43 is a perspective view of a containment rail having one flange.
Figure 44:
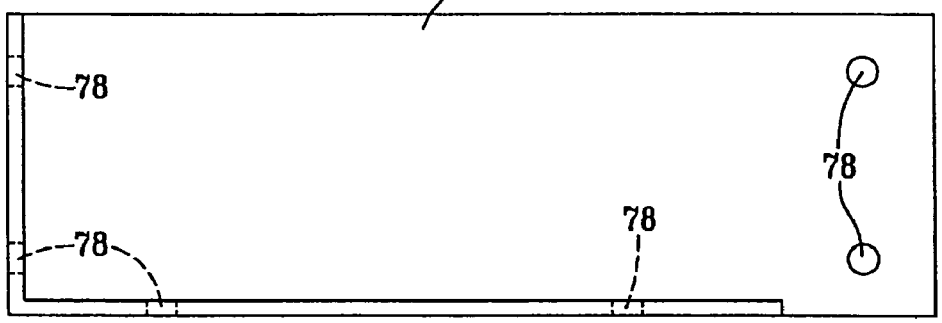
FIG. 44 is a front view of the containment rail of FIG. 43.
Figure 45:
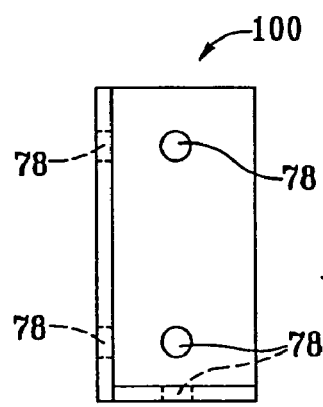
FIG. 45 is a side view of the containment rail of FIG. 43.
Figure 46:
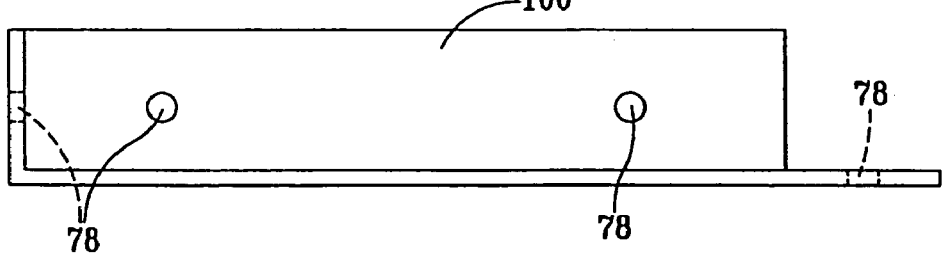
FIG. 46 is a top view of the containment rail of FIG. 43.
Figure 47:
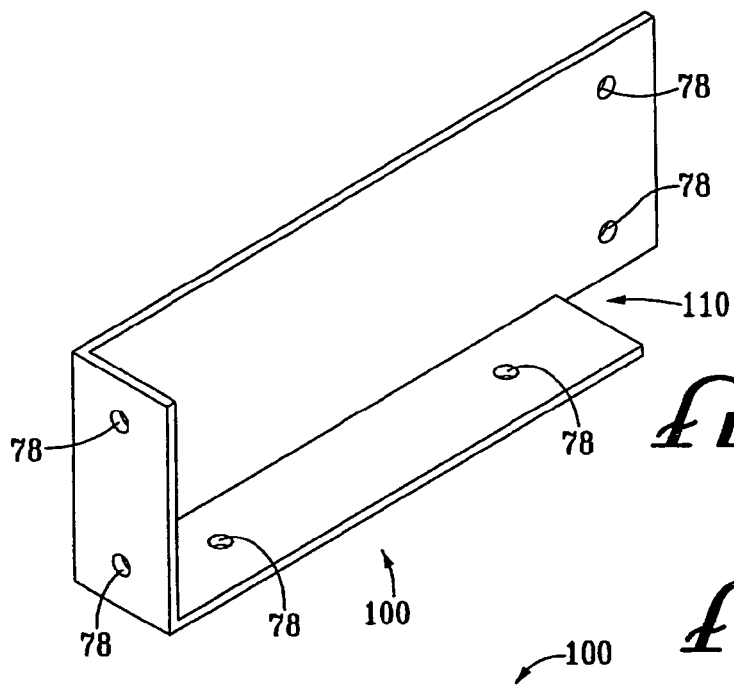
FIG. 47 is a perspective view of a containment rail having a notch.
Figure 48:
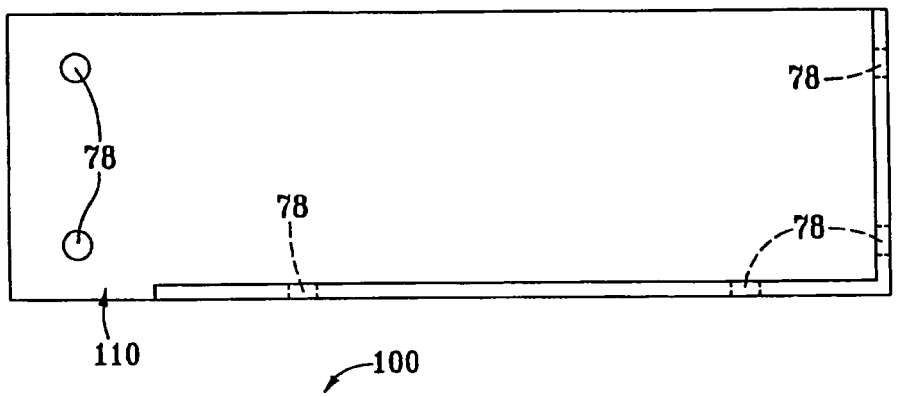
FIG. 48 is a front view of the containment rail of FIG. 47.
Figure 49:
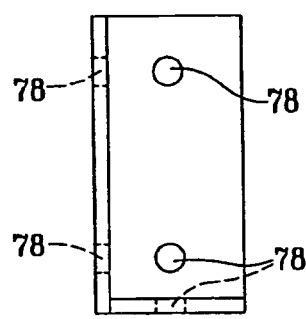
FIG. 49 is a side view of the containment rail of FIG. 47.
Figure 50:
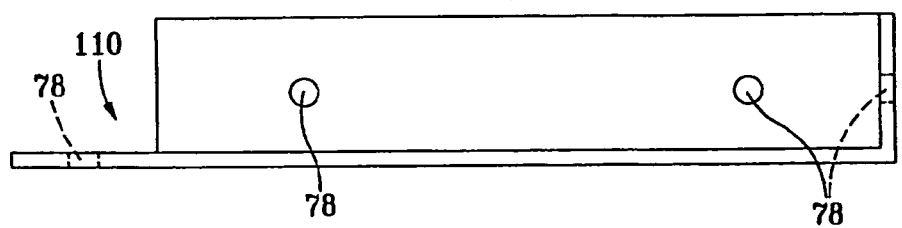
FIG. 50 is a top view of the containment rail of FIG. 47.

FIG. 31 is a perspective view of another embodiment of a containment rail 100. FIGS. 32-34 depict the front view, side view and top view of the containment rail of FIG. 31 respectively. The rail 100 has flanges and holes 78. The dimensions, size, shape and/or configuration of the containment rail may be changed as desired for the particular application. Examples of such different embodiments are provided in FIGS. 35-38 and FIGS. 39-42. Other variations of the components of the containment rail system 20 are possible. For example, the containment rail 100 may have no flanges, one flange, two flanges, or more than two flanges. Often the number of flanges depends on the mounting requirements of the system. FIGS. 43-46 illustrate a containment rail 100 that has one flange, while FIGS. 31-42 depict containment rails having two flanges. As another example of a variation to the containment rail, FIGS. 47-50 illustrate a containment rail 100 having a notch 110. As discussed above, the notch 110 permits the building of an inverted containment rail system as shown in FIG. 8.

FIGS. 52-55, 56-59 and 60-63 are views of a containment rail having slots. The slots allow the rail to be slidably mounted to the floor or other components to form a containment rail system of variable dimensions. The number, shape and dimensions of the slots may be changed as desired.

Figure 51:
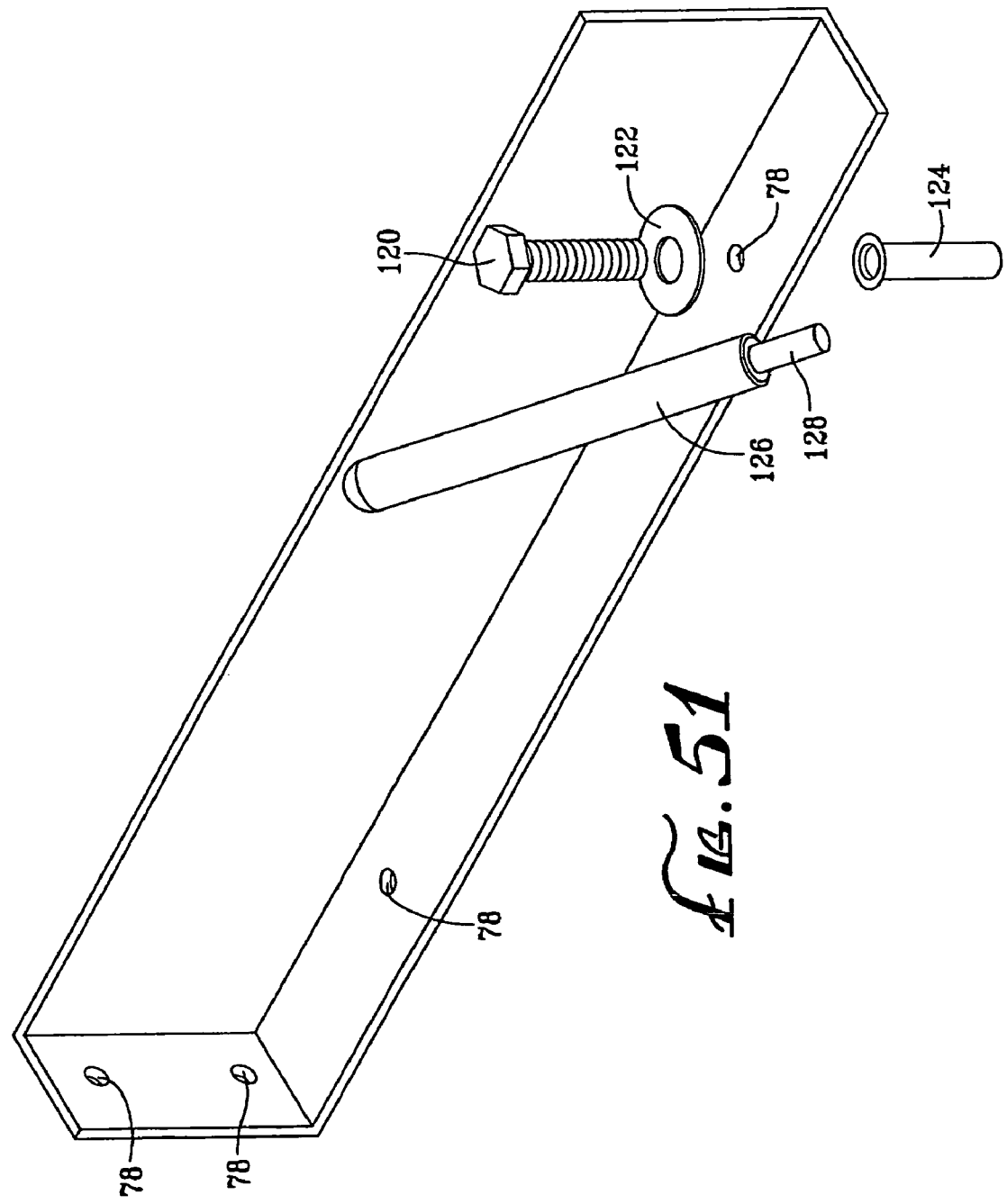
FIG. 51 is a perspective view of a containment rail with components to mount the rail to the floor.
Figure 52:
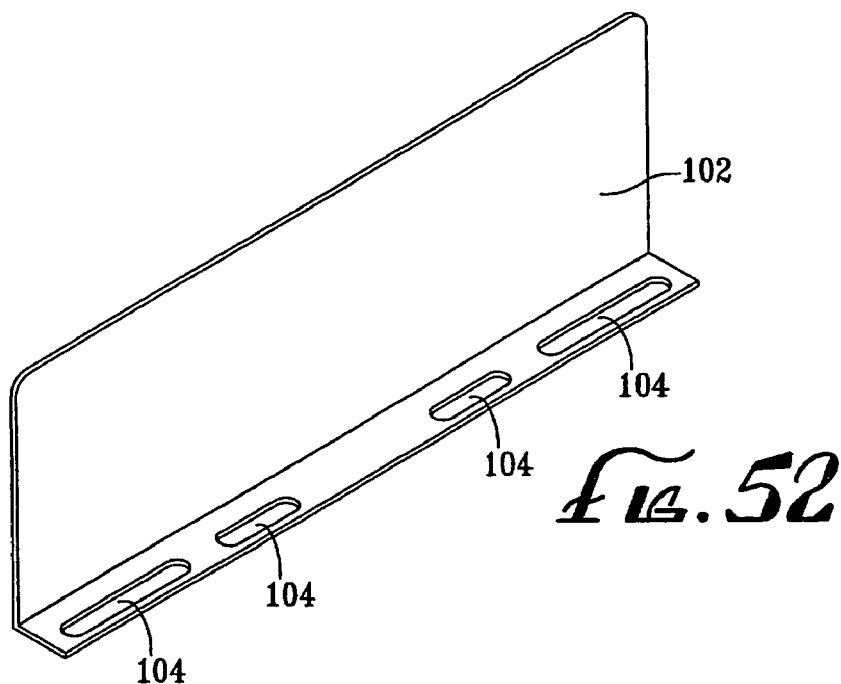
FIG. 52 is a perspective view of a containment rail having slots.
Figure 53:
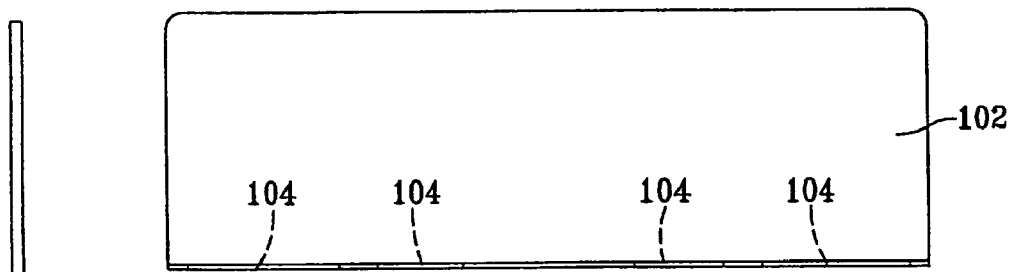
FIG. 53 is a front view of the containment rail of FIG. 52.
Figure 54:
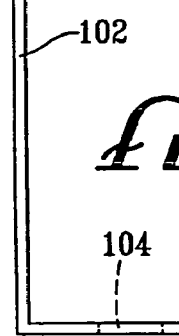
FIG. 54 is a side view of the containment rail of FIG. 52.
Figure 55:
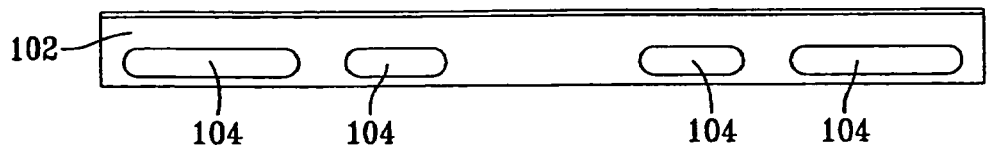
FIG. 55 is a top view of the containment rail of FIG. 52.

FIG. 51 is a perspective view of a containment rail with components to mount the wall to the floor. A concrete floor is prepared according to the specification set forth by the American Society of Testing Materials (ASTM). Specifically, the installer follows the ASTM specification for coating a concrete floor with epoxy to make the floor watertight. The proposed spill containment system preferably does not use adhesive to glue a spill containment system to the floor. Preferably instead, after the epoxy has dried, holes are drilled into the floor so that the spill containment system can be bolted to the floor. Bolting the system to the floor instead of gluing the system to the floor allows users to use battery lifting equipment. It is important to allow the normal use of battery lifting equipment because batteries in a battery rack must be serviced regularly and replaced as needed. Bolting rather than gluing the system to the floor also avoids the labor intensive nature of using an adhesive and waiting one to two days for the adhesive to cure.

While any mounting components may be used to secure the spill containment system to the floor, FIG. 51 illustrates an example that uses a screw 120, optional washer 122, and optional floor anchor 124. An anchor punch tool 126 with its punching surface 128 may be used to create an appropriately sized hole in the floor so that the floor anchor 124 may be then inserted into the floor. The floor anchor 124 is inserted into the hole in the floor. The screw 120 is inserted into the washer 122, through the hole 78 and into the floor anchor 124. The purpose of the floor anchor 124 is to increase the degree to which the screw 120 is secured to the floor. Thus, the floor anchor 124 also increases the integrity of the system if the system must hold the spilled substance during an emergency. Containment rails are bolted to one another to form a containment rail system. A sealant such as butyl rubber may be applied to all seams and holes to further create a watertight seal. This procedure for building a spill containment system can be used regardless if the system is for containing spills from a new or existing battery rack.

While the spill containment system has been proposed for containing acid spills from batteries, it can be used to contain spills from any device such as air conditioning units (which may leak water or freon), water heaters (which may leak water), or any other device. Moreover, it is not limited to containing and/or neutralizing acid spills as it can be used to contain and/or neutralize any kind of spill including a non-acidic spill.

While embodiments and implementations of the subject invention have been shown and described, it should be apparent that many more embodiments and implementations are within the scope of the subject invention. Accordingly, the invention is not to be restricted, except in light of the claims and their equivalents.

What is claimed is:

1. A battery spill containment system for containing a hazardous spilled substance from at least one industrial battery in service as a back-up power supply, the battery spill containment system comprising:
    a containment rail system to define a perimeter to accommodate the at least one industrial battery;
    a flexible liner for placement within the perimeter defined by the containment rail system, the flexible liner having a base and an edge, wherein the edge rises at least about four inches above the base, the flexible liner being resistant to damage from the spilled substance; and
    a material for placement within the perimeter defined by the containment rail system, the material to absorb and chemically neutralize the spilled substance from the at least one industrial battery so that the hazardous nature of the spilled substance to humans or material structures is reduced,
    wherein the containment rail system is mounted to the floor whereby battery lifting equipment can be used to access the at least one industrial battery for servicing or replacement.

2. The battery spill containment system of claim 1 wherein the containment rail system is coated with a material that is resistant to damage from the spilled substance.

3. The battery spill containment system of claim 1 wherein the containment rail system is coated with polyvinylchloride.

4. The battery spill containment system of claim 1 wherein the flexible liner is coated with polyvinylchloride.

5. The battery spill containment system of claim 1 wherein the flexible liner comprises polyvinylchloride.

6. The battery spill containment system of claim 1 wherein the dimensions of the containment rail system are adjustable.

7. The battery spill containment system of claim 1 wherein the containment rail system is invertible between a first and second configuration such that in the first configuration, the exterior surfaces of the containment rail system have no protruding structures and in the second configuration, the exterior surfaces of the containment rail system have protruding structures.

8. The battery spill containment system of claim 1 further comprising a protective member that protects the material from the industrial battery.

9. The battery spill containment system of claim 8 wherein the protective member comprises a grid placed between the industrial battery and the material.

10. The battery spill containment system of claim 1 further comprising a spill detector that detects whether a spill has occurred.

11. The battery spill containment system of claim 10 wherein the spill detector indicates whether a spill has occurred.

12. The battery spill containment system of claim 10 wherein when the spill detector detects that a spill has occurred, the spill detector alerts a device.

13. The battery spill containment system of claim 10 wherein the spill detector communicates with a device when the spill detector detects that a spill has occurred such that the device performs an act to remedy the spill.

14. The battery spill containment system of claim 10 wherein the spill detector includes a circuit having an electrical characteristic and a circuit monitor that monitors the electrical characteristic of the circuit and when the electrical characteristic changes appropriately, the circuit monitor determines that a spill has occurred.

15. The battery spill containment system of claim 14 wherein the circuit includes a plurality of conductors and the electrical characteristic is the amount of current flowing through the plurality of conductors.

16. The battery spill containment system of claim 10 wherein the spill detector includes:
    a permeable membrane through which the spilled substance may pass to contact the circuit; and
    a circuit monitor that monitors whether the spilled substance has passed through the permeable membrane.

17. A battery spill containment system for containing a hazardous spilled substance from at least one industrial battery in service as a back-up power supply, the battery spill containment system comprising:
    a plurality of containment rails to define a perimeter to accommodate the at least one industrial battery;
    a flexible liner for placement within the perimeter defined by the plurality of containment rails, the flexible liner having a base and an edge, wherein the edge rises at least about four inches above the base, the flexible liner to protect the floor from the spilled substance; and
    a material for placement within the perimeter defined by the plurality of containment rails, the material to absorb and chemically neutralize the spilled substance from the at least one industrial battery so that the hazardous nature of the spilled substance to humans or material structures is reduced,
    wherein the plurality of containment rails are mounted to the floor whereby battery lifting equipment can be used to access the at least one industrial battery for servicing or replacement.

18. A battery spill containment system comprising:
- a plurality of containment rails connectable to one another to define a perimeter having a desired shape and size to accommodate at least one industrial battery for operation therein as a back-up power supply;
- a flexible liner for placement in the perimeter defined by the plurality of containment rails, the flexible liner have a base and an edge rising at least about four inches from the base, the flexible liner having a perimeter substantially conforming to the perimeter defined by the plurality of containment rails, the flexible liner to protect the floor within the perimeter from a spilled substance from the at least one industrial battery; and
- a material for placement within the perimeter defined by the plurality of containment rails, the material to absorb the spilled hazardous substance from the at least one industrial battery so that the hazardous nature of the spilled substance to humans or material structures is reduced,
- wherein the plurality of containment rails are mounted to the floor, whereby battery lifting equipment can be used to access the at least one industrial battery for servicing or replacement.

19. A battery spill containment system for containing a spilled substance from at least one industrial battery in service as a back-up power supply, the battery spill containment system comprising:
- a plurality of containment rails adapted to connect to one another to define a perimeter in which the at least one industrial battery is placed;
- a flexible liner adapted to substantially conform to and sit within the perimeter defined by the connected containment rails, the flexible liner having a base and an edge with a height of at least about four inches above the base, the flexible liner being resistant to damage from the spilled substance; and
- a material for placement in the flexible liner, the material adapted to absorb and chemically neutralize the spilled substance,
- wherein the plurality of containment rails are mounted to the floor, whereby battery lifting equipment can be used to service and replace the at least one industrial battery.

* * * * *